(12) United States Patent
Saxena et al.

(10) Patent No.: US 9,935,777 B2
(45) Date of Patent: Apr. 3, 2018

(54) ELECTRONIC SIGNATURE FRAMEWORK WITH ENHANCED SECURITY

(71) Applicant: Adobe Systems Incorporated, San Jose, CA (US)

(72) Inventors: Neha Saxena, New Delhi (IN); Divij Kumar, New Delhi (IN); Aditya Kumar Pandey, New Delhi (IN)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 14/840,380

(22) Filed: Aug. 31, 2015

(65) Prior Publication Data

US 2017/0063553 A1 Mar. 2, 2017

(51) Int. Cl.
*H04L 9/32* (2006.01)

(52) U.S. Cl.
CPC .......... *H04L 9/3247* (2013.01); *H04L 9/3226* (2013.01); *H04L 9/3236* (2013.01)

(58) Field of Classification Search
CPC .... H04L 9/3226; H04L 9/3236; H04L 9/3247
See application file for complete search history.

(56) References Cited

U.S. PATENT DOCUMENTS

| | | | |
|---|---|---|---|
| 4,621,334 A | 11/1986 | Garcia | |
| 4,805,222 A | 2/1989 | Young | |
| 5,825,880 A | 10/1998 | Sudia et al. | |
| 5,910,987 A | 6/1999 | Ginter et al. | |
| 6,073,101 A | 6/2000 | Maes | |
| 6,091,835 A | 6/2000 | Smithies et al. | |
| 6,157,935 A | 12/2000 | Tran et al. | |
| 6,240,091 B1 | 5/2001 | Ginzboorg et al. | |
| 6,615,234 B1 | 9/2003 | Adamske et al. | |

(Continued)

FOREIGN PATENT DOCUMENTS

WO 0148986 A1 7/2001

OTHER PUBLICATIONS

Craig Le Clair, "What to Look for in E-Signature Providers" (Nov. 15, 2011). Available at https://www.echosign.adobe.com/content/dam/echosign/docs/pdfs/Forrester_What_To_Look_For_In_E-Signature_Providers_Nov_2011.pdf.

(Continued)

*Primary Examiner* — Khoi Le
(74) *Attorney, Agent, or Firm* — Finch & Maloney PLLC

(57) ABSTRACT

Improved document processing workflows provide a secure electronic signature framework by reducing attack vectors that could be used to gain unauthorized access to digital assets. In one embodiment an electronically signed document is removed from an electronic signature server after signed copies of the document are distributed to all signatories. The electronic signature server optionally retains an encrypted copy of the signed document, but does not retain the decryption password. This limits the amount of data retained by the electronic signature server, making it a less attractive target for hackers. However, the electronic signature server still maintains audit data that can be used to identify a signed document and validate an electronic signature. For example, a hash of the document (or other document metadata) can be used to validate the authenticity of an electronically signed document based on a logical association between an electronic signature and the signed document.

7 Claims, 10 Drawing Sheets

(56) References Cited

U.S. PATENT DOCUMENTS

| | | |
|---|---|---|
| 6,691,089 B1 | 2/2004 | Huan-yu et al. |
| 6,928,421 B2 | 8/2005 | Craig et al. |
| 6,959,382 B1 | 10/2005 | Kinnis et al. |
| 7,206,938 B2 | 4/2007 | Bender |
| 7,562,053 B2 | 7/2009 | Twining |
| 7,581,109 B2 | 8/2009 | Boursetty et al. |
| 7,694,143 B2 | 4/2010 | Karimisetty et al. |
| 7,779,355 B1 | 8/2010 | Erol et al. |
| 7,895,166 B2 | 2/2011 | Foygel et al. |
| 7,996,367 B2 | 8/2011 | Foygel et al. |
| 7,996,439 B2 | 8/2011 | Foygel et al. |
| 8,126,868 B1 | 2/2012 | Vincent |
| 8,230,232 B2 | 7/2012 | Ahmed |
| 8,234,494 B1 | 7/2012 | Bansal et al. |
| 8,332,253 B1 | 12/2012 | Farmer |
| 8,443,443 B2 | 5/2013 | Nordstrom |
| 8,844,055 B2 | 9/2014 | Follis et al. |
| 8,918,311 B1 | 12/2014 | Johnson et al. |
| 8,930,308 B1 | 1/2015 | Johnson et al. |
| 9,058,515 B1 | 6/2015 | Amtrup et al. |
| 9,059,858 B1 | 6/2015 | Giardina et al. |
| 9,292,876 B1 | 3/2016 | Shimkus |
| 9,626,653 B2 | 4/2017 | Saxena |
| 2001/0002485 A1 | 5/2001 | Brisbee |
| 2002/0038290 A1 | 3/2002 | Cochran et al. |
| 2002/0062322 A1 | 5/2002 | Genghini |
| 2002/0091651 A1* | 7/2002 | Petrogiannis ........... G06F 21/64 705/76 |
| 2002/0095290 A1 | 7/2002 | Kahn et al. |
| 2002/0103656 A1 | 8/2002 | Bahler et al. |
| 2003/0009513 A1 | 1/2003 | Ludwig et al. |
| 2003/0037004 A1 | 2/2003 | Buffum et al. |
| 2003/0074216 A1 | 4/2003 | Salle |
| 2003/0083906 A1 | 5/2003 | Howell et al. |
| 2003/0130953 A1 | 7/2003 | Narasimhan et al. |
| 2003/0154083 A1 | 8/2003 | Kobylevsky et al. |
| 2003/0177361 A1 | 9/2003 | Wheeler |
| 2003/0187671 A1 | 10/2003 | Kumhyr et al. |
| 2003/0217275 A1 | 11/2003 | Bentley et al. |
| 2004/0024688 A1 | 2/2004 | Bi et al. |
| 2004/0102959 A1 | 5/2004 | Estrin |
| 2004/0139344 A1 | 7/2004 | Maurer |
| 2004/0167847 A1 | 8/2004 | Nathan |
| 2004/0187037 A1 | 9/2004 | Checco |
| 2004/0204939 A1 | 10/2004 | Liu et al. |
| 2004/0225887 A1 | 11/2004 | O'Neil et al. |
| 2004/0243811 A1 | 12/2004 | Frisch et al. |
| 2004/0264652 A1 | 12/2004 | Erhart et al. |
| 2005/0132196 A1 | 6/2005 | Dietl |
| 2005/0228665 A1 | 10/2005 | Kobayashi |
| 2005/0228999 A1* | 10/2005 | Jerdonek ............. H04L 63/0823 713/176 |
| 2005/0289345 A1 | 12/2005 | Haas et al. |
| 2006/0020460 A1 | 1/2006 | Itou |
| 2006/0041828 A1 | 2/2006 | King et al. |
| 2006/0110011 A1 | 5/2006 | Cohen et al. |
| 2006/0122880 A1 | 6/2006 | Franco |
| 2006/0143462 A1* | 6/2006 | Jacobs ................... G06F 21/64 713/181 |
| 2006/0157559 A1* | 7/2006 | Levy ...................... G06K 17/00 235/380 |
| 2006/0212813 A1 | 9/2006 | Yalovsky et al. |
| 2006/0253324 A1 | 11/2006 | Miller |
| 2006/0280339 A1 | 12/2006 | Cho |
| 2007/0055517 A1 | 3/2007 | Spector |
| 2007/0113164 A1 | 5/2007 | Hansen et al. |
| 2007/0124507 A1 | 5/2007 | Gurram et al. |
| 2007/0143398 A1 | 6/2007 | Graham |
| 2007/0220614 A1* | 9/2007 | Ellis ..................... G06F 21/6245 726/27 |
| 2007/0226511 A1 | 9/2007 | Wei et al. |
| 2008/0015883 A1* | 1/2008 | Hermann ............. G06F 21/6245 705/317 |
| 2008/0177550 A1 | 7/2008 | Mumm et al. |
| 2008/0180213 A1 | 7/2008 | Flax |
| 2008/0195389 A1 | 8/2008 | Zhang et al. |
| 2008/0209229 A1 | 8/2008 | Ramakrishnan |
| 2009/0025087 A1* | 1/2009 | Peirson, Jr. ............ G06Q 10/00 726/27 |
| 2009/0062944 A1 | 3/2009 | Wood et al. |
| 2009/0112767 A1 | 4/2009 | Hammad et al. |
| 2009/0116703 A1 | 5/2009 | Schultz |
| 2009/0117879 A1* | 5/2009 | Pawar .................... G06Q 20/10 455/412.1 |
| 2009/0177300 A1 | 7/2009 | Lee |
| 2009/0222269 A1 | 9/2009 | Mori |
| 2009/0228584 A1 | 9/2009 | Maes et al. |
| 2009/0254345 A1 | 10/2009 | Fleizach et al. |
| 2009/0254572 A1 | 10/2009 | Redlich et al. |
| 2009/0260060 A1* | 10/2009 | Smith .................... H04L 63/105 726/3 |
| 2009/0307744 A1 | 12/2009 | Nanda et al. |
| 2009/0327735 A1* | 12/2009 | Feng ..................... H04L 9/0891 713/180 |
| 2010/0131533 A1 | 5/2010 | Ortiz |
| 2010/0161993 A1* | 6/2010 | Mayer .................... G06F 21/64 713/178 |
| 2010/0281254 A1 | 11/2010 | Carro |
| 2010/0306670 A1 | 12/2010 | Quinn et al. |
| 2011/0022940 A1 | 1/2011 | King et al. |
| 2011/0047385 A1* | 2/2011 | Kleinberg ............... G06F 21/64 713/176 |
| 2011/0212717 A1 | 9/2011 | Rhoads et al. |
| 2011/0225485 A1 | 9/2011 | Schnitt |
| 2012/0072837 A1* | 3/2012 | Triola .................... G06Q 50/18 715/268 |
| 2012/0190405 A1 | 7/2012 | Kumaran |
| 2012/0254332 A1 | 10/2012 | Irvin |
| 2013/0006642 A1 | 1/2013 | Saxena et al. |
| 2013/0046645 A1 | 2/2013 | Grigg et al. |
| 2013/0089300 A1 | 4/2013 | Soundararajan et al. |
| 2013/0103723 A1 | 4/2013 | Hori |
| 2013/0132091 A1 | 5/2013 | Skerpac |
| 2013/0138438 A1 | 5/2013 | Bachtiger |
| 2013/0166915 A1 | 6/2013 | Desai et al. |
| 2013/0179171 A1 | 7/2013 | Howes |
| 2013/0182002 A1 | 7/2013 | Macciola et al. |
| 2013/0191287 A1 | 7/2013 | Gainer et al. |
| 2013/0263283 A1 | 10/2013 | Peterson |
| 2013/0269013 A1 | 10/2013 | Parry et al. |
| 2013/0283189 A1 | 10/2013 | Basso et al. |
| 2013/0326225 A1* | 12/2013 | Murao .................. H04L 9/3247 713/176 |
| 2013/0339358 A1 | 12/2013 | Huibers et al. |
| 2013/0346356 A1 | 12/2013 | Welinder et al. |
| 2014/0019761 A1 | 1/2014 | Shapiro |
| 2014/0019843 A1 | 1/2014 | Schmidt |
| 2014/0078544 A1 | 3/2014 | Motoyama et al. |
| 2014/0079297 A1 | 3/2014 | Tadayon et al. |
| 2014/0108010 A1 | 4/2014 | Maltseff et al. |
| 2014/0168716 A1 | 6/2014 | King et al. |
| 2014/0236978 A1 | 8/2014 | King et al. |
| 2014/0244451 A1 | 8/2014 | Mayer |
| 2014/0279324 A1 | 9/2014 | King |
| 2014/0282243 A1 | 9/2014 | Eye et al. |
| 2014/0294302 A1 | 10/2014 | King et al. |
| 2014/0343943 A1 | 11/2014 | Al-Telmissani |
| 2014/0365281 A1 | 12/2014 | Onischuk |
| 2014/0372115 A1 | 12/2014 | LeBeau et al. |
| 2015/0012417 A1 | 1/2015 | Joao et al. |
| 2015/0016661 A1 | 1/2015 | Lord |
| 2015/0063714 A1 | 3/2015 | King et al. |
| 2015/0073823 A1 | 3/2015 | Ladd et al. |
| 2015/0100578 A1 | 4/2015 | Rosen et al. |
| 2015/0127348 A1 | 5/2015 | Follis |
| 2015/0172058 A1 | 6/2015 | Follis |
| 2015/0213404 A1 | 7/2015 | Follis |
| 2015/0245111 A1 | 8/2015 | Berry et al. |

(56) References Cited

U.S. PATENT DOCUMENTS

2015/0294094 A1 10/2015 Hefeeda
2016/0078869 A1 3/2016 Syrdal et al.

OTHER PUBLICATIONS

U.S. Appl. No. 14/534,583, filed Nov. 6, 2014.
U.S. Appl. No. 14/551,560, filed Nov. 24, 2014.
U.S. Appl. No. 14/625,852, filed Feb. 19, 2015.
EchoSign Jan. 2015 Release, retrieved from <https://www.echosign.adobe.com/content/dam/echosign/docs/pdfs/AdobeES_JanuaryRelease_WhatsNew.pdf> on Aug. 24, 2015.
Simske, Steven J. Dynamic Biometrics: The Case for a Real-Time Solution to the Problem of Access Control, Privacy and Security. 2009 First IEEE International Conference on Biometrics, Identiy and Security. Pub. Date: 2009. http://ieeexplore.ieee.org/stamp/stamp.jsp?tp=&arnumber=5507535.
Maeder, Anthony; Fookes, Clinton; Sridharan, Sridha. Gaze Based User Authentication for Personal Computer Applications. Proceedings of 2004 International Symposium on Intelligent Multimedia, Video and Speech Processing. Pub. Date: 2004. http://ieeexplore.ieee.org/stamp/stamp.jsp?tp=&arnumber=1434167.
Notice of Allowance received in U.S. Appl. No. 14/625,852 (dated Jul. 25, 2016).
Notice of Allowance received in U.S. Appl. No. 14/107,967 (dated Nov. 3, 2016) (6 pages).
Notice of Allowance received in U.S. Appl. No. 14/551,560 (dated Nov. 4, 2016) (19 pages).
Araújo et al., "User Authentication Through Typing Biometrics Features", IEEE Transactions on Signal Processing, vol. 53, No. 2, pp. 851-855 (2005).
Deng et al., "Keystroke Dynamics User Authentication Based on Gaussian Mixture Model and Deep Belief Nets", ISRN Signal Processing, vol. 2013, Article ID 565183, 7 pages (2013).
Moskovitch et al., "Identity Theft, Computers and Behavioral Biometrics", Proceedings of the 2009 IEEE International Conference on Intelligence and Security Informatics, pp. 155-160 (2009).
Notice of Allowance received in U.S. Appl. No. 14/534,583 (8 pages) (dated May 2, 2017).
Notice of Allowance received in U.S. Appl. No. 14/069,674 (8 pages) (dated Jan. 24, 2018).

* cited by examiner

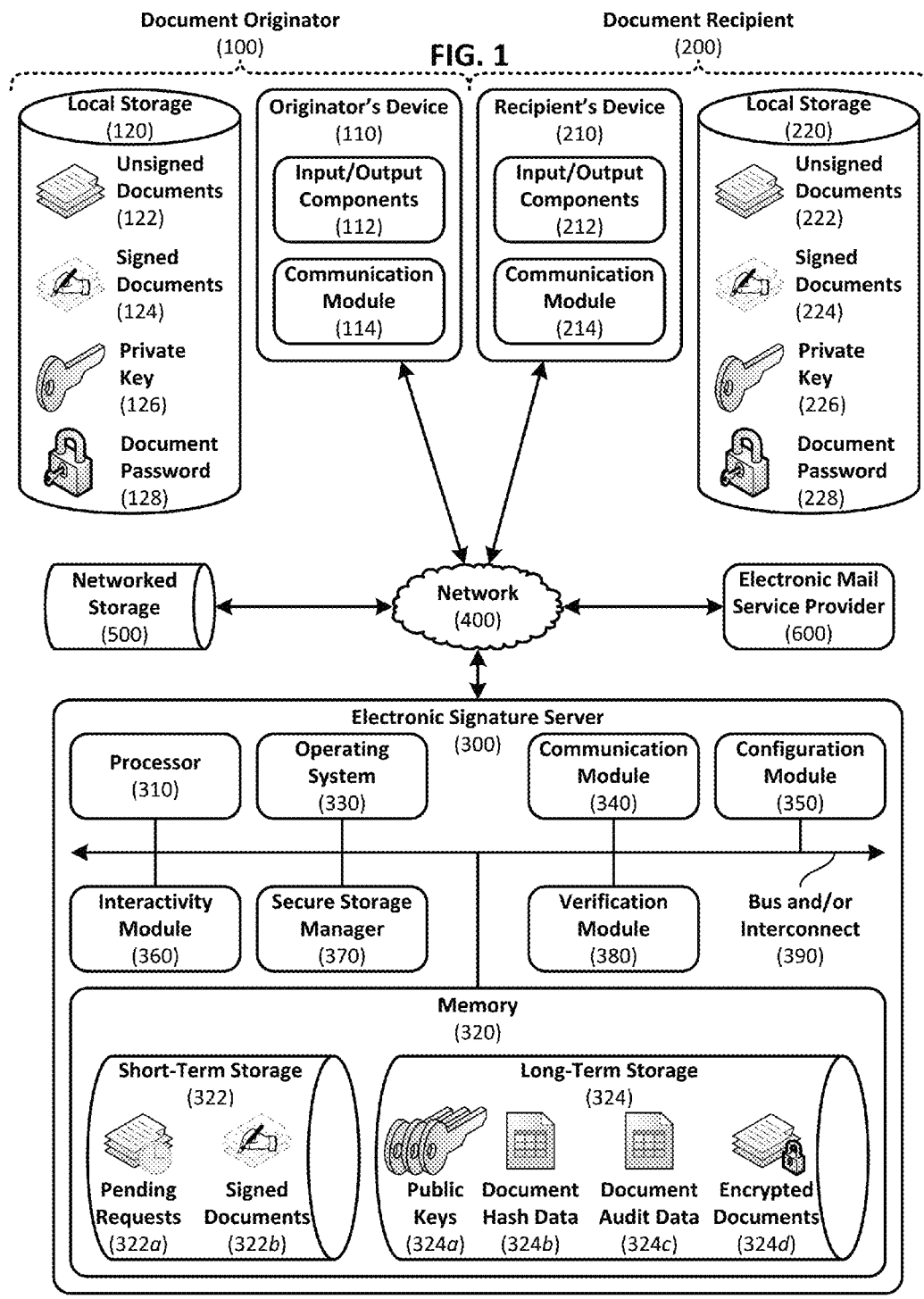

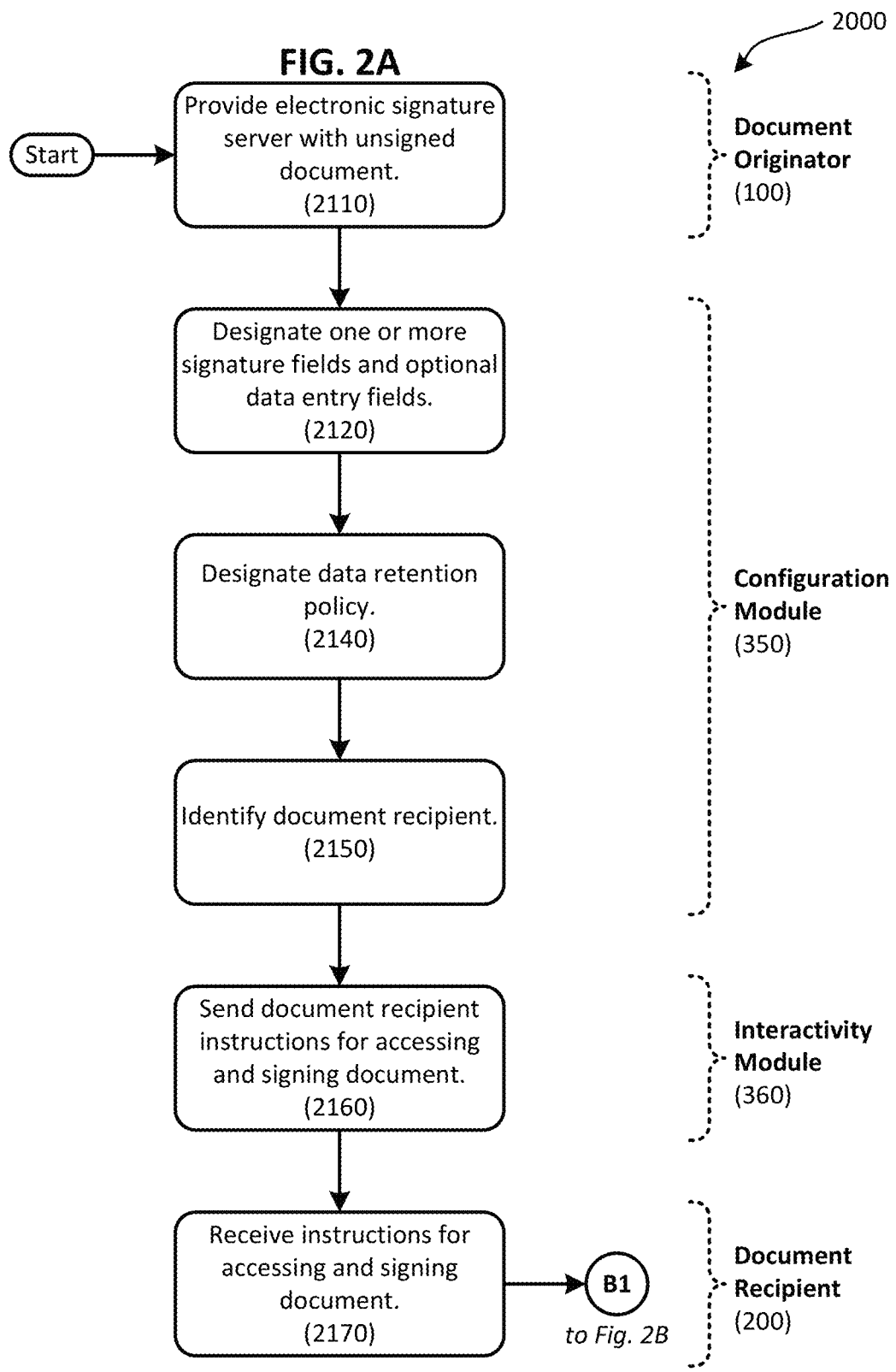

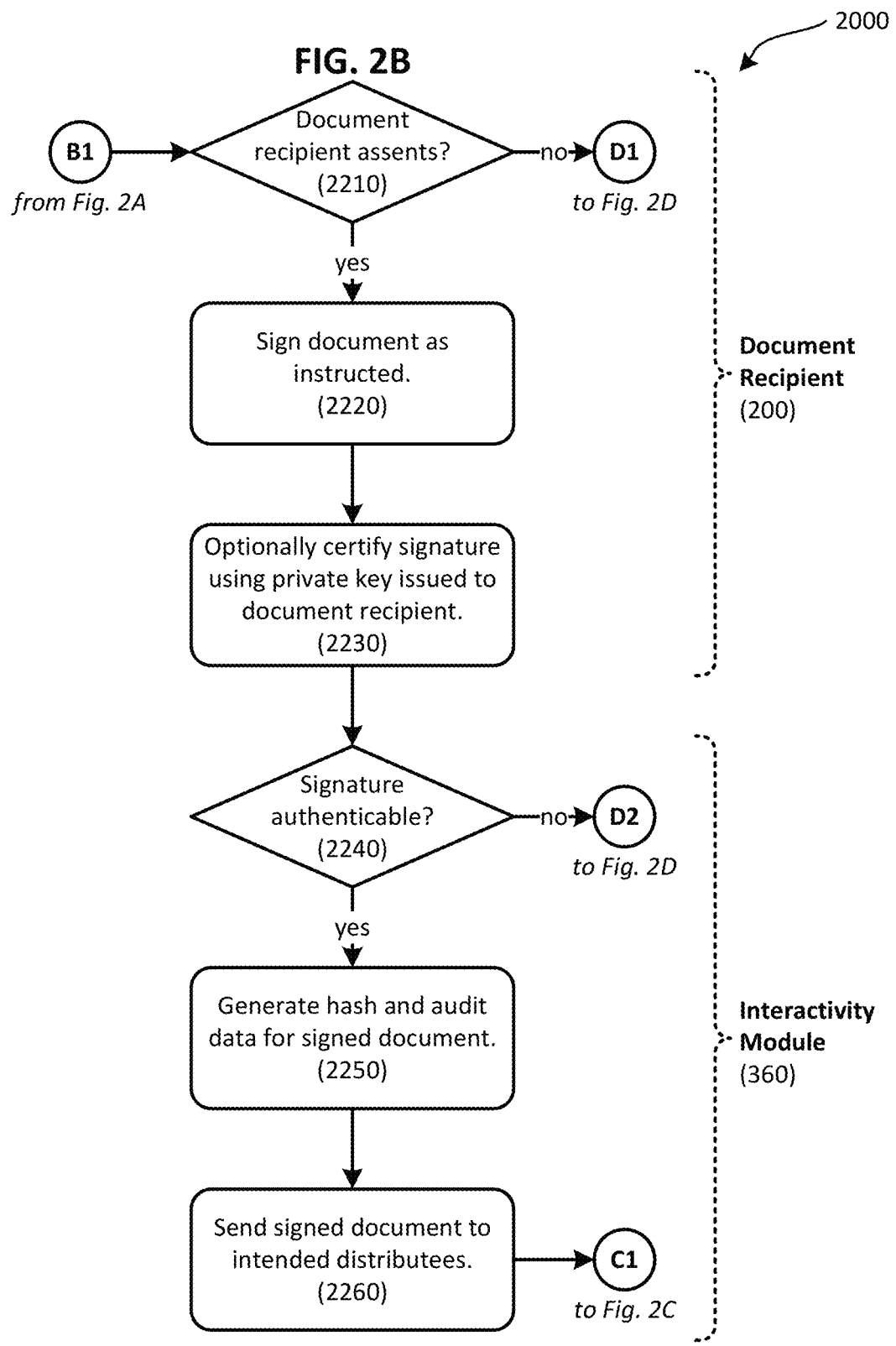

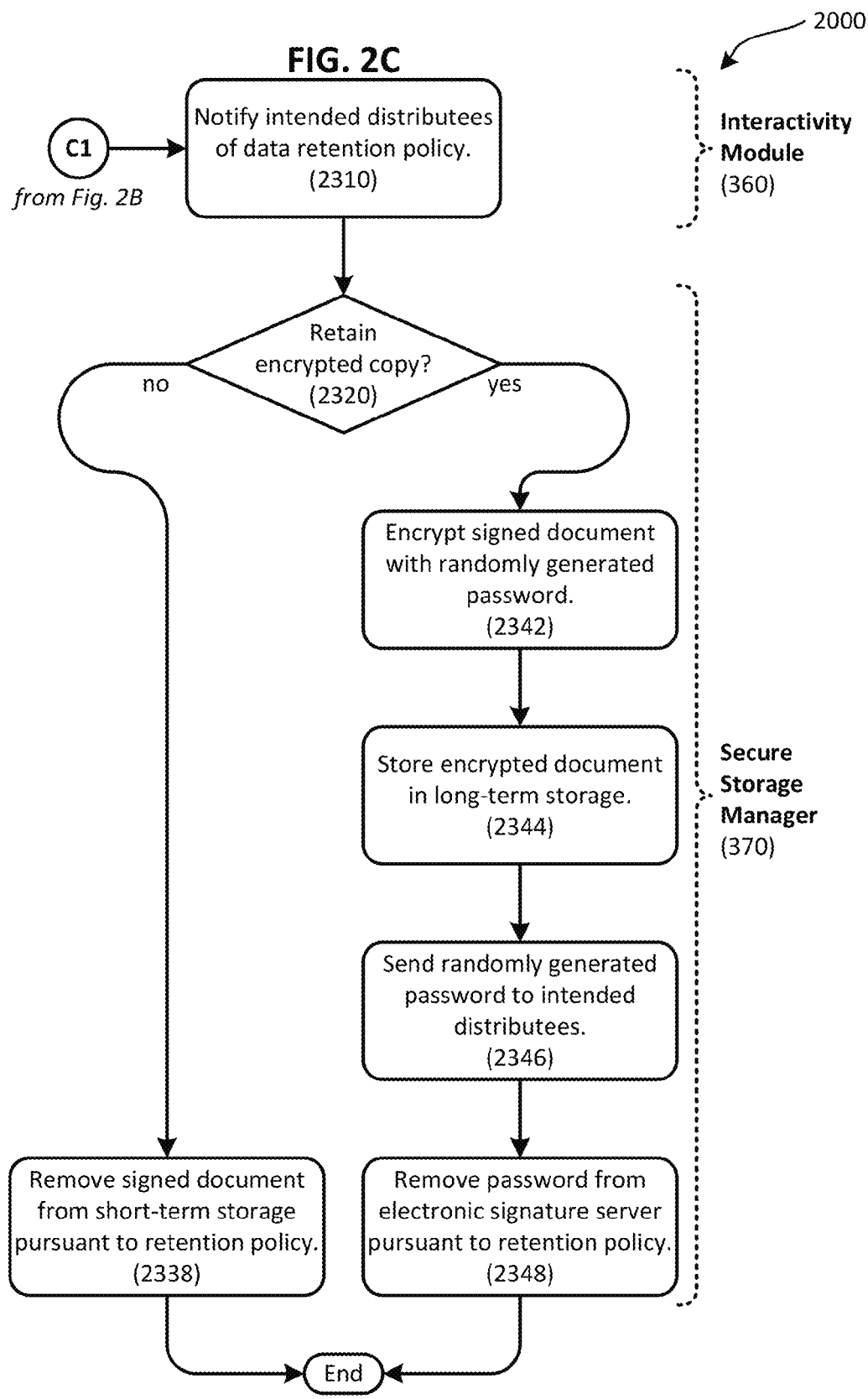

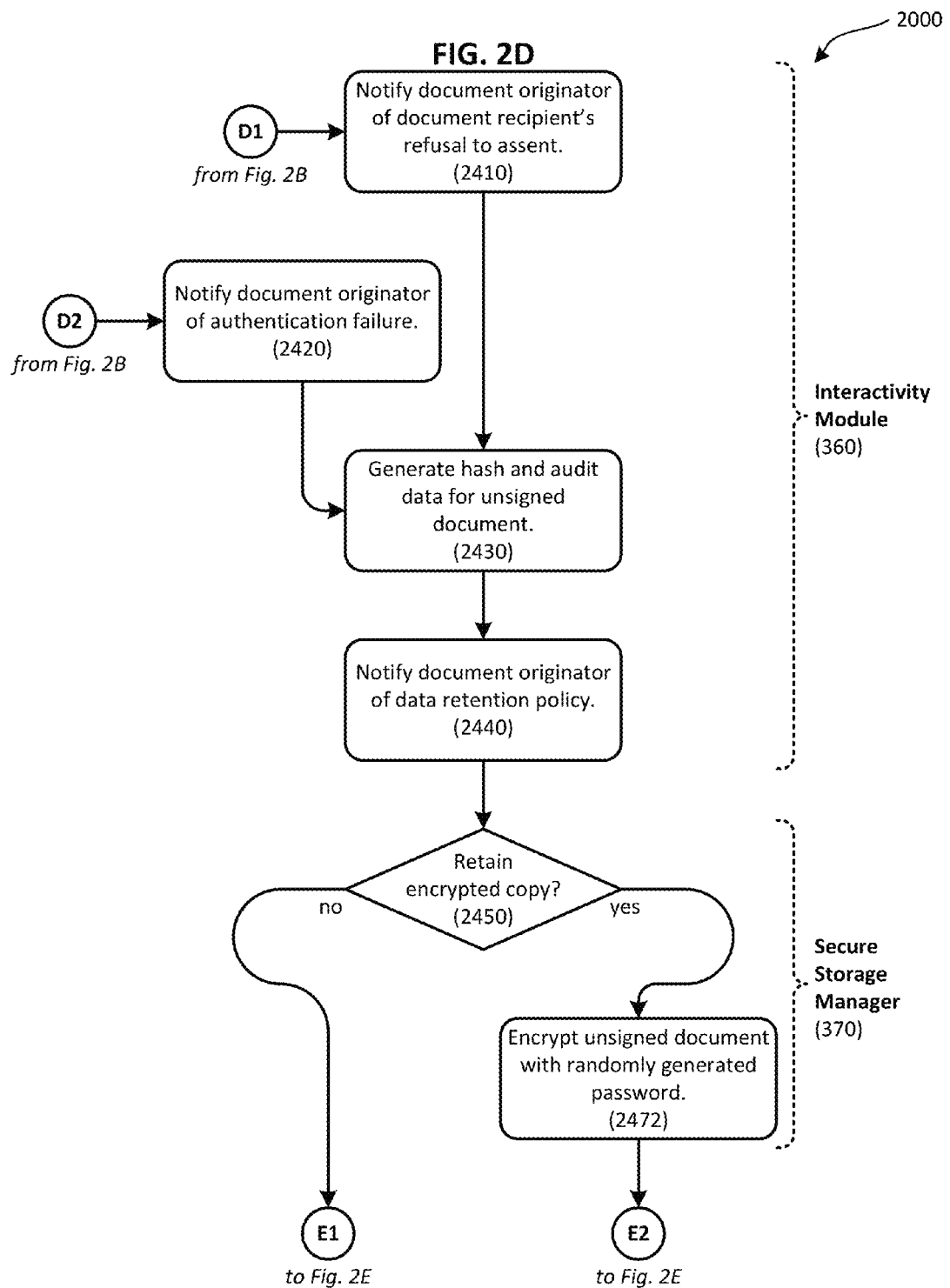

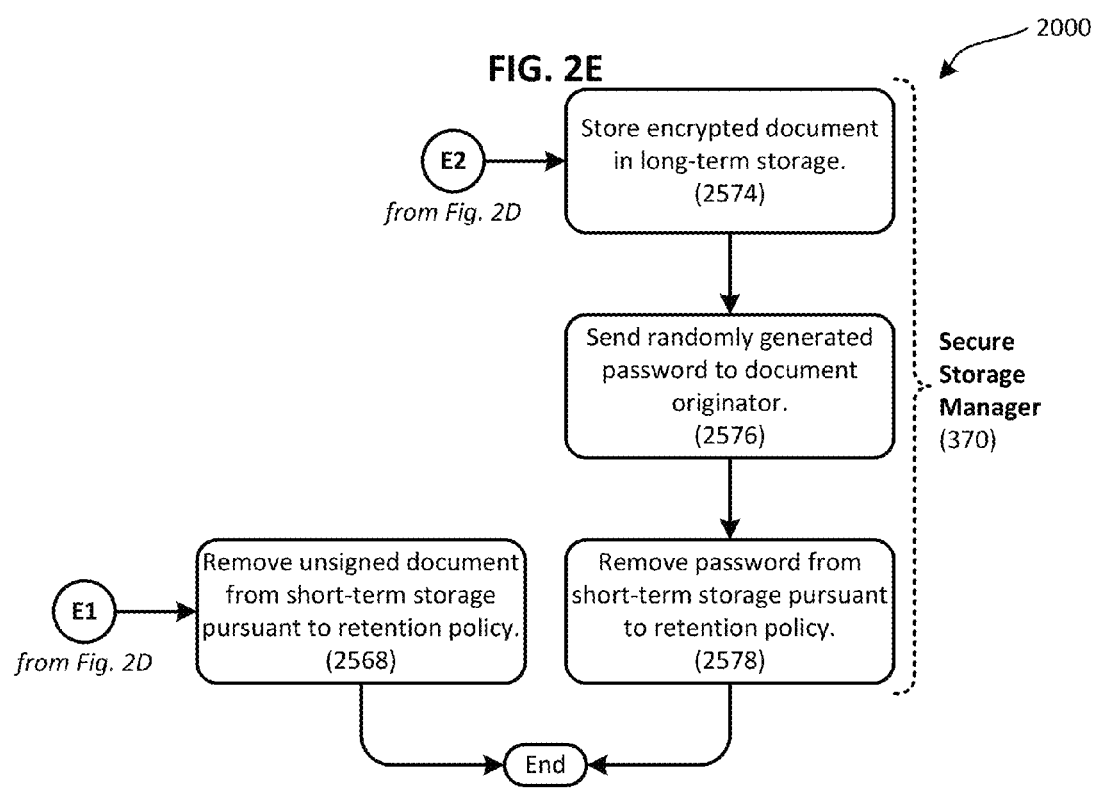

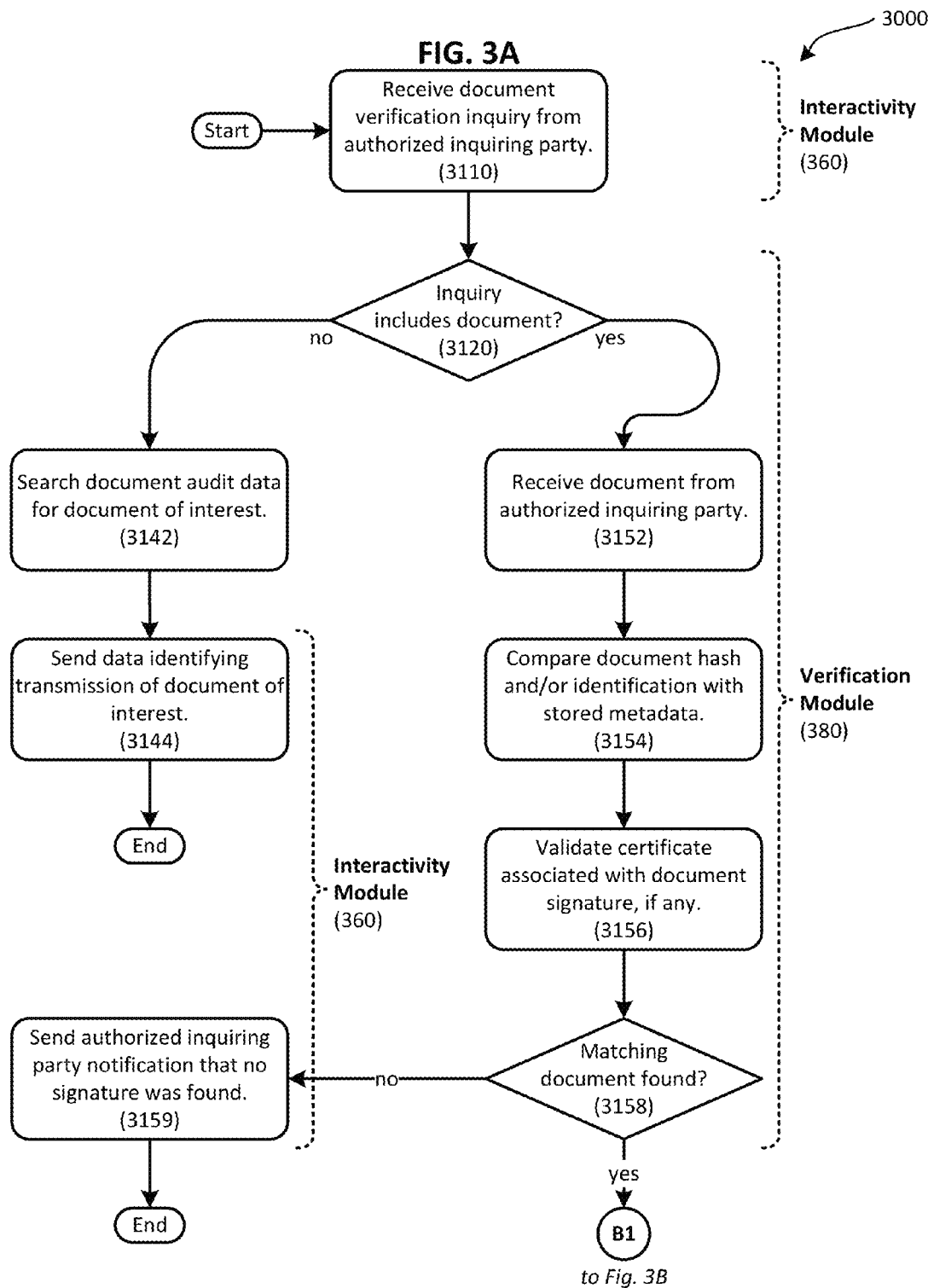

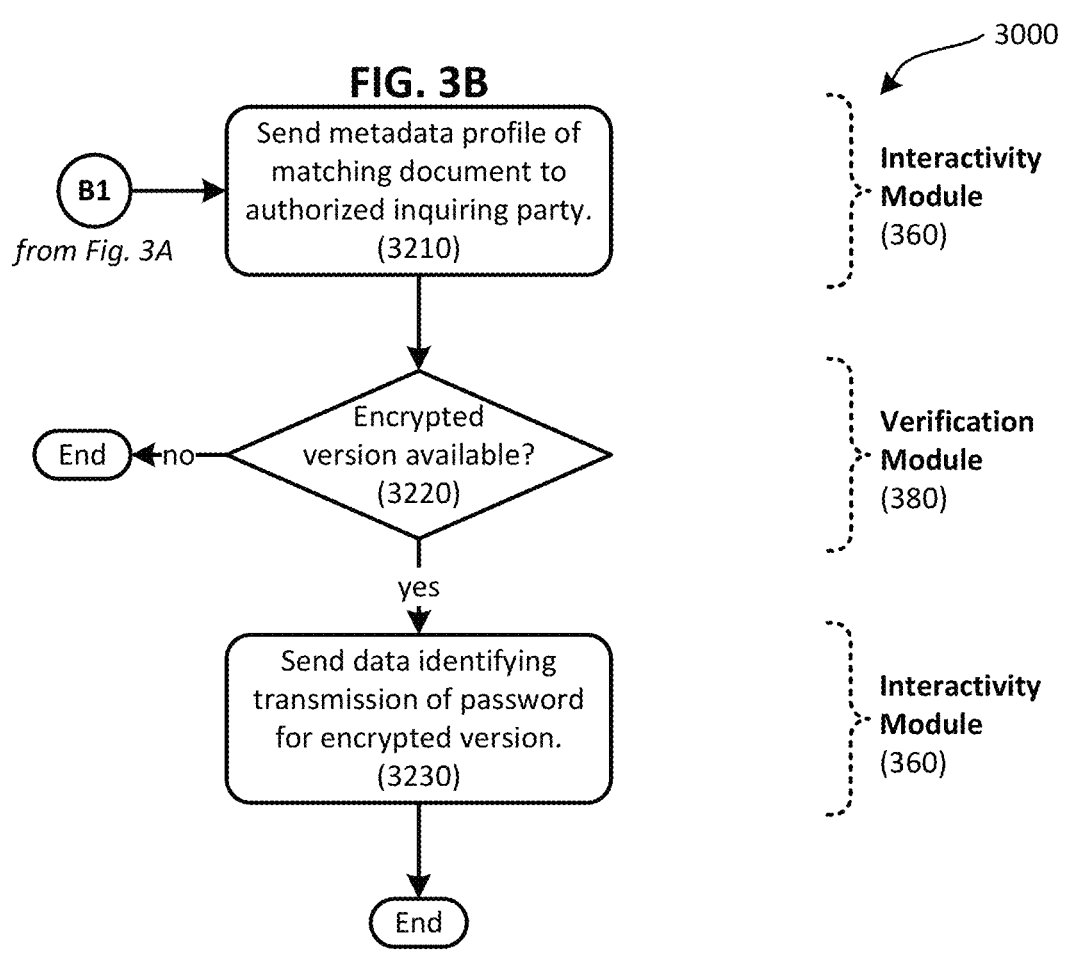

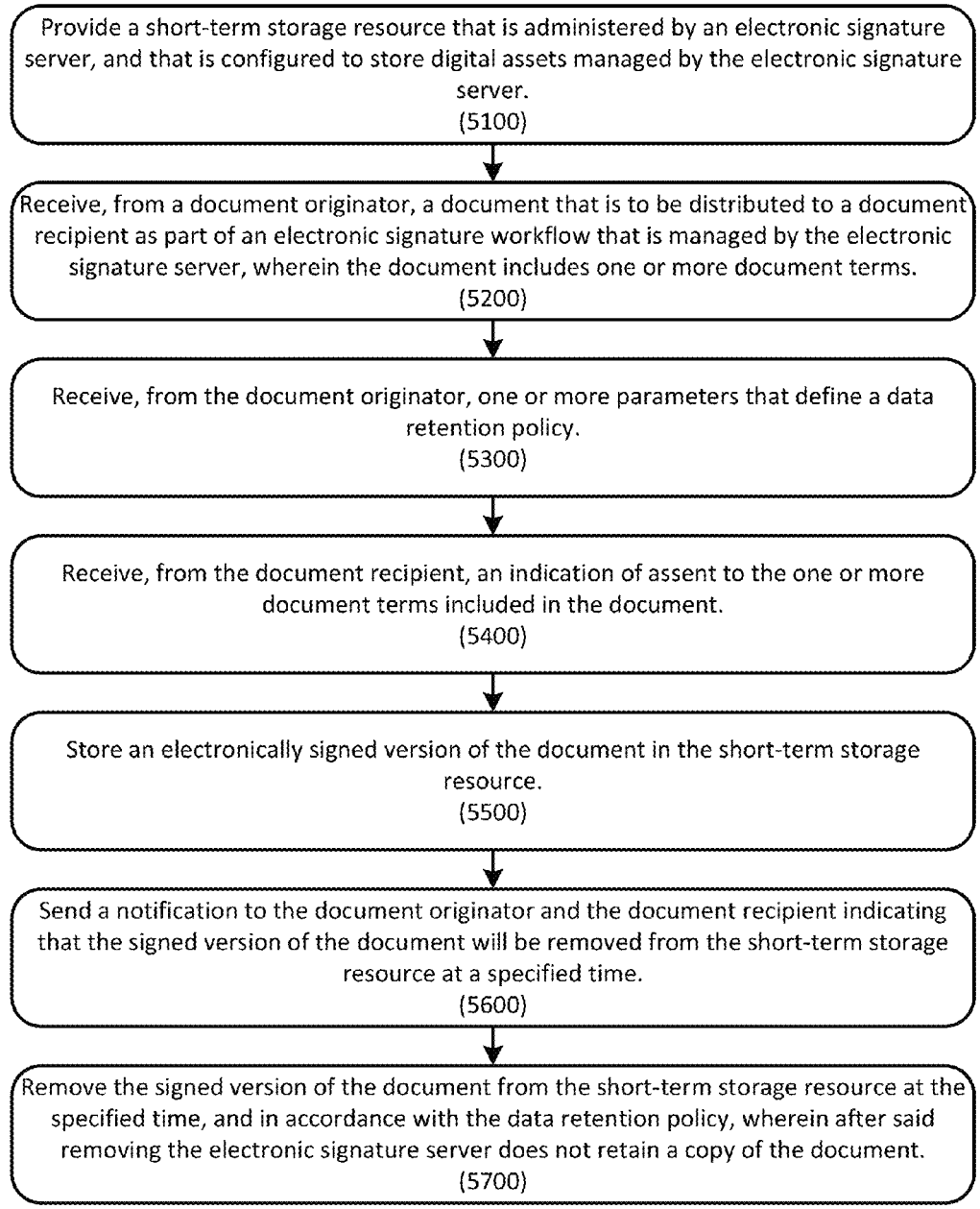

US 9,935,777 B2

ELECTRONIC SIGNATURE FRAMEWORK WITH ENHANCED SECURITY

FIELD OF THE DISCLOSURE

This disclosure relates generally to document processing workflows, and more specifically to workflows that provide a secure electronic signature framework.

BACKGROUND

Computers and electronic documents have become an increasingly indispensable part of modern life. In particular, as virtual storage containers for binary data, electronic documents have gained acceptance not only as a convenient replacement for conventional paper documents, but also as a useful way to store a wide variety of digital assets such as webpages, sound recordings, and videos. The increased use of electronic documents has resulted in the adaptation of conventional paper-based document processing workflows to the electronic realm. One such adaptation has been the increased use and acceptance of electronic signatures on agreements, contracts, and other documents. When negotiating parties reach an agreement with respect to a course of action, state of affairs, or other subject matter, the resulting agreement is usually reduced to writing and executed by the parties as a way to memorialize the terms of the agreement. Traditionally, a physical copy of the agreement was executed with a personalized stamp, seal, or handwritten signature. However, since this "reduction to writing" now often takes the form of an electronic document stored on a computer readable medium, electronic signatures have become commonplace and have indeed gained widespread legal recognition. See, for example, the Electronic Signatures in Global and National (ESIGN) Commerce Act, 15 U.S.C. § 96. Even where an agreement is never actually reduced to writing, the resulting "oral contract" may still be enforceable if evidentiary questions as to the substance of the underlying agreement can be resolved. The wide variety of different formats and legal requirements relating to agreements has resulted in a correspondingly wide variety of workflows—both conventional and electronic—that facilitate the negotiation, formation, execution, fulfillment, and management of agreements, contracts, and other documents.

BRIEF DESCRIPTION OF THE DRAWINGS

FIG. 1 is a block diagram illustrating selected components of an example computer system that can be used to provide a secure electronic signature framework.

FIGS. 2A through 2E comprise a flowchart illustrating an example method for using an electronic signature server to acquire an electronic signature on a document and designate a data retention policy for the resulting electronically signed document.

FIGS. 3A and 3B comprise a flowchart illustrating an example method for using an electronic signature server to identify and/or verify the authenticity of an electronically signed document, wherein the electronic signature server does not retain the signed document and/or a document password.

FIG. 5 is a flowchart illustrating an example computer-implemented electronic signature acquisition method.

DETAILED DESCRIPTION

Figure 4:
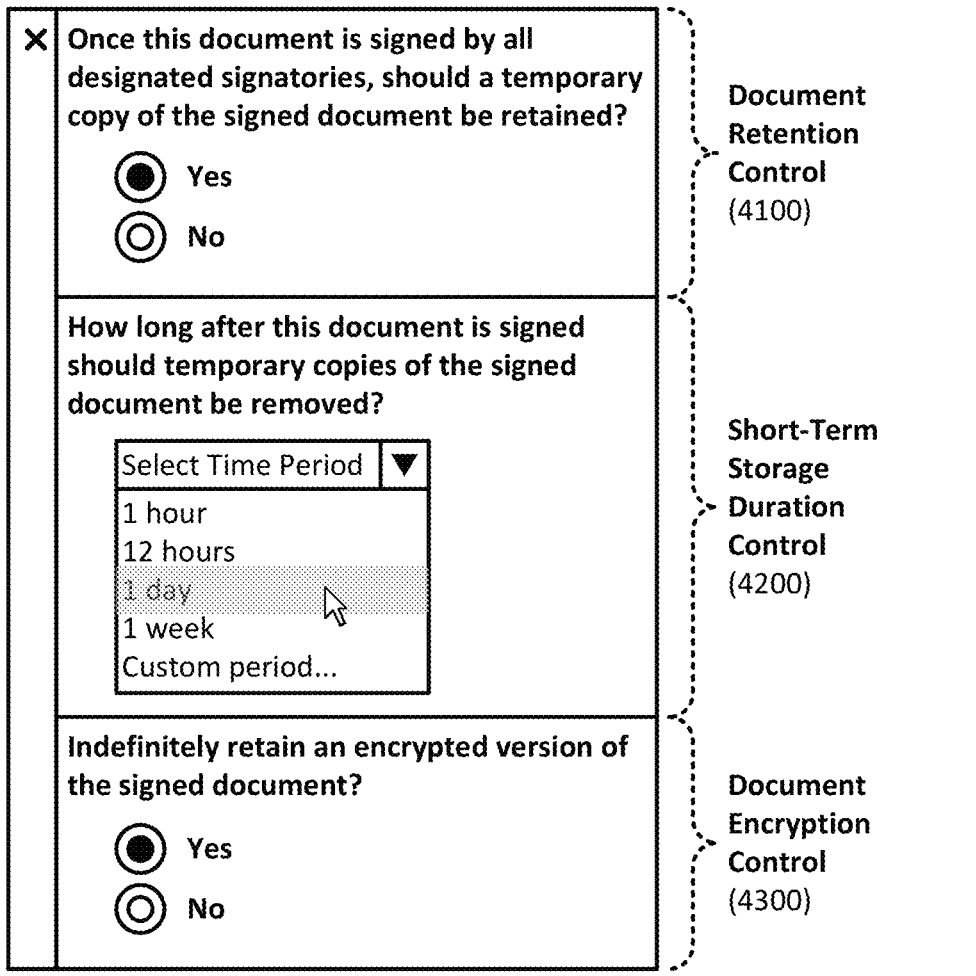
FIG. 4 is an example user interface that can be used to define a data retention policy for an electronically signed document.

While many efficiencies and benefits have been derived from the implementation of workflows based on electronic signatures, such workflows still suffer from certain shortcomings and disadvantages. For example, existing electronic signature systems include a document repository that functions as an archive for both signed and unsigned documents that are processed by the electronic signature system. Such a repository provides a resource for signatories or other authorized parties to obtain a copy of a document sometime after the document is initially received by the electronic signature system. Despite this nominal utility, providing such a document repository introduces significant security vulnerabilities into the overarching electronic signature framework. In particular, the document repository provides a potential attack vector for a hacker attempting to gain unauthorized access to sensitive materials. Given the ubiquity of networked storage resources, and given that the documents processed by an electronic signature system are often also stored elsewhere, such as by the signatories themselves, configuring an electronic signature server to provide redundant document storage not only provides little marginal benefit for users, but also results in a significantly less secure electronic signature framework. The significance of this security vulnerability is enhanced by the fact that electronic signature servers are known to store massive volumes of highly sensitive data. For example, the disclosure of information stored by an electronic signature server may lead to loss of competitive advantage and legal liability among other adverse outcomes. Such a repository therefore presents an attractive target to a wide range of bad actors, including individual clandestine hackers, organized cybercriminals, domestic government security agencies, and governments of rogue nation-states.

Thus, and in accordance with certain of the embodiments disclosed herein, improved document processing workflows provide a more secure electronic signature framework by reducing potential attack vectors that could be used to gain unauthorized access to digital assets. For example, in one embodiment an electronically signed document is removed from the electronic signature server 24 hours after signed copies of the document are distributed to all signatories. In a modified embodiment, the electronic signature server optionally retains an encrypted copy of the signed document, but does not retain the password used to decrypt the encrypted document. A wide range of other data retention policies, for example invoking other time periods and/or triggered by other workflow events, can be implemented in other embodiments. The data retention policy governing a particular signature acquisition workflow can be defined along with other aspects of the workflow when the workflow is initially configured. In general such a data retention policy will be understood as limiting the amount of data retained by the electronic signature server, thus making it a less attractive target for hackers. However, the electronic signature server is still configured to maintain audit data that can be used to identify a signed document and validate an electronic signature. For example, a hash of the document (or other document metadata) can be used to validate the authenticity of an electronically signed document based on a logical association between an electronic signature (which is recorded in metadata retained by the electronic signature server) and the signed document itself (which is retained by a signatory or other authorized party). Numerous alternative configurations and modifications will be apparent in light of this disclosure.

Thus in certain embodiments an improved electronic signature workflow does not require consumers to store their digital assets using a storage resource provided by and/or associated with the electronic signature service provider. Such embodiments increase the security of an electronic signature framework by making the framework a less attractive target for attack. In particular, certain of the embodiments disclosed herein are based on a recognition that it is impossible to provide an impenetrable defense against all conceivable security threats, and that all digital networks are vulnerable to attacks from a sufficiently motivated, skilled, and funded hacker. Such embodiments seek not only to avoid and withstand the inevitable attack, but further to reduce or eliminate the amount of information exposed in the event that a successful attack does occur. This is a significant advantage, given that even the most rigorous security protocols can be rendered useless when users pick insecure passwords, fail to configure security features, or leak trusted information.

A wide range of benefits can be derived from certain of the embodiments disclosed herein. From an end user's standpoint, limiting the amount of data retained at an electronic signature server provides greater data security based on the recognition that the fewer places a digital asset is stored, the fewer opportunities an attacker has to access that digital asset. Moreover, enabling end users to store their digital assets in a repository of their choosing provides greater control over the security protocols used to protect such assets. From the electronic signature service provider's standpoint, storing fewer valuable digital assets not only makes the service a less attractive target, but it also reduces or eliminates the potential liability—both financial and reputational—associated with such an attack. For example, when an attacker accesses sensitive information from a digital service provider as a result of a weak password or other user error, it is often the reputation of the digital service provider that is tarnished. Retaining document metadata which can be used to later validate the authenticity of an electronically signed document allows the electronic signature framework to comply with regulatory requirements that call for retaining a record of an electronic signature.

As used herein, the term "document" refers, in addition to its ordinary meaning, to any collection of information that can be communicated between users of the various systems disclosed herein. As used herein, the term "document terms" refers, in addition to its ordinary meaning, to content provided within, or accessible via, a document. A document can take the form of a physical object, such as one or more papers containing printed information, or in the case of an "electronic document", a computer readable medium containing digital data. Electronic documents can be rendered in a variety of different ways, such as via display on a screen, by printing using an output device, or aurally using an audio player and/or text-to-speech software. Thus, it will be appreciated that electronic documents may include digital assets in addition to or instead of text; such digital assets may include, for example, audio clips, video clips, photographs, and other multimedia assets. Documents may encompass a virtually unlimited range of subject matter, including documents that contain terms that are to be agreed to amongst various participants in a given workflow. Examples of such documents include agreements, settlements, and legally binding contracts. For instance, both a word processing file containing the terms of a legally enforceable contract as well as a compressed audio file containing an audio recording of the same contract terms would both be considered "documents" for the purposes of this disclosure. Such textual and audio components may be combined into a single "document" in certain embodiments. Documents may be communicated amongst users by a variety of techniques ranging from physically moving papers containing printed matter to wired and/or wireless transmission of digital data.

As used herein, the term "document originator" (or "originator") refers, in addition to its ordinary meaning, to a user or entity that represents the source of a document in a workflow. Likewise, the term "document recipient" (or "recipient") refers, in addition to its ordinary meaning, to a user or entity that represents the target of a document in a workflow. Thus, in a generalized workflow, a document originator can be understood as sending a document to a document recipient. It will be appreciated that a document originator may not necessarily be the creator, author, or generator of a particular document, but rather may simply be a user or entity that initiates a workflow by sending a document to a recipient. Likewise, the document recipient may not be the ultimate recipient of a document, particularly where a document is routed amongst multiple users in a given workflow. Thus, a single user or entity may act as both a document originator and a document recipient in different contexts. It will also be appreciated that the terms document originator and document recipient are not limited to people or users, but may also refer to entities, organizations, workstations, or computing devices which originate or receive documents as part of a workflow. Finally, a given workflow may not necessarily involve the document itself being transmitted from document originator to document recipient; in some cases other data related to a document, such as metadata and/or a network address, may be transmitted between a document originator and a document recipient.

As used herein, the term "electronic signature" refers, in addition to its ordinary meaning, to data that can be attached to, or logically associated with, an electronic document. Thus an electronic signature may comprise, for example, a string of characters, a digital key, a bitmap image such as an image of a handwritten signature, an audio and/or visual recording of a person reciting a spoken phrase such as "I agree to these terms", a visual recording of a person performing a sequence of physical gestures, or any suitable combination of the foregoing. Electronic signatures may or may not be encrypted or otherwise encoded in a way that limits access and/or modification by unauthorized parties. An electronic signature may be personalized and associated with a particular individual, or may be generated automatically in response to a specified user input, such as the selection of an electronic checkbox, the checking of a button in a graphical user interface, or the generation of a touchtone using a telephone keypad. It will be appreciated that an electronic signature need not be incorporated into a particular electronic document, but may simply be stored in a resource managed by, for example, an electronic signature server, which can then create a logical association between the electronic signature and a particular electronic document. Where an electronic signature is encoded using binary digits, it may also be referred to as a "digital signature". Examples of products which provide services associated with an electronic signature server include Adobe Document Cloud (Adobe Systems Incorporated, San Jose, Calif.), and DocuSign eSignature (DocuSign, Inc., San Francisco, Calif.). An electronic signature is one manifestation of assent to the terms of a document.

System Architecture

FIG. 1 is a block diagram illustrating selected components of an example computer system that can be used to provide a secure electronic signature framework. This computer system can be understood as enabling a document originator 100 and a document recipient 200 to interact with each other in a document processing workflow that is managed by an electronic signature server 300. In such embodiments, document originator 100, document recipient 200, and electronic signature server 300 can communicate with each other via a network 400. Network 400 can also be used to access optional supplementary resources such as networked storage 500 and/or an email service provider 600, although additional or alternative resources may be provided in other embodiments. In some cases such supplementary resources are omitted, and the corresponding functionality associated with such resources is instead provided by one or more of document originator 100, document recipient 200, or electronic signature server 300. Thus other embodiments may have fewer or more networked resources depending on the granularity of implementation. The various embodiments disclosed herein therefore are not limited to provision or exclusion of any particular resources.

As illustrated in FIG. 1, document originator 100 has access to a device 110 that facilitates interaction with other users and components of the various systems described herein. For example, device 110 may comprise one or more of a variety of suitable computing devices, such as handheld computers, cellular telephones, tablet computers, smartphones, laptop computers, desktop computers, and set-top boxes. Other devices or combinations of devices may be used in other embodiments. In one implementation, device 110 includes input/output components 112 such as one or more of a keyboard, a touch sensitive display, a pointing device, and/or any other suitable input/output device. Device 110 also optionally includes a wired and/or wireless communication module 114 that enables communication with other components via network 400. In one particular implementation, device 110 comprises a smartphone capable of connecting to other components via a cellular data connection. In general, device 110 may include additional or alternative components as compared to those illustrated in FIG. 1, and it will be appreciated that the various embodiments disclosed herein are not limited to any particular configuration of device 110.

In certain embodiments device 110 provides functionality that enables document originator 100 to generate, modify, retrieve, or otherwise manipulate an electronic document. One or more collections of electronic documents can be stored in a local storage resource associated with device 110, such as local storage 120. Examples of local storage 120 include an internal hard drive, integrated random access memory, and a removable universal serial bus drive. In alternative embodiments device 110 is also configured to access remote storage resources, such as networked storage 500, storage hosted by electronic signature server 300, or storage hosted by electronic mail service provider 600. As illustrated in FIG. 1, local storage 120 contains a collection of unsigned documents 122 and a collection of signed documents 124, although fewer documents may be stored in other embodiments. Unsigned documents 122 can be understood as documents which have been prepared for signature, but which have not actually been signed yet. Signed documents 124 can be understood as documents that have been signed using, for example, services provided by electronic signature server 300.

Local storage 120 may also store other digital assets used in certain implementations of the electronic signature framework disclosed herein. For example, in one embodiment local storage 120 contains a private key 126 that is uniquely assigned to document originator 100. Private key 126 can be used, for example, to certify the authenticity of an electronic signature, or to reliably identify document originator 100 as the source of a document. In such embodiments private key 126 works in conjunction with a corresponding public key 324a held by electronic signature server 300. In another embodiment local storage 120 contains a document password 128 that can be used to decrypt and access the content of an encrypted document.

Document originator 100 can use the resources provided by device 110, including the assets contained in local storage 120, to initiate and control an electronic signature workflow. For example, in one embodiment device 110 is used to draft a new bill of sale for an automobile that document originator 100 wishes to sell. In another embodiment a contract provider sends an email to document originator 100 containing standard terms of an automobile bill of sale which originator 100 can then modify to conform to the requirements of his/her particular application. In either case, document originator 100 uses input/output components 112 to generate a document that includes a wide range of digital assets and security features, such as a digital certificate signed by private key 126. The document may also be encrypted such that password 128 is required to access its content. The various components that comprise the digital asset can be stored together as a single document or may be stored separately but remain connected by a logical association such as a network address. In another embodiment, local storage 120 may contain a list of document passwords 128, each one of which may be used to decrypt and access the content of an encrypted document. In such embodiments, each encrypted document has its own password.

Still referring to FIG. 1, document recipient 200 has access to a device 210 that facilitates interaction with other users and components of the various systems described herein. For example, device 210 may comprise one or more of a variety of suitable computing devices, such as handheld computers, cellular telephones, tablet computers, smartphones, laptop computers, desktop computers, and set-top boxes. Other devices or combinations of devices may be used in other embodiments. In one implementation, device 210 includes input/output components 212 such as one or more of a keyboard, a touch sensitive display, a pointing device, a hand gesture recognition device, and/or any other suitable input/output device or sensor device. Device 210 also optionally includes a wired and/or wireless communication module 214 that enables communication with other components via network 400. In one particular implementation, device 210 comprises a smartphone capable of connecting to other components via a cellular data connection. In general, device 210 may include additional or alternative components as compared to those illustrated in FIG. 1, and it will be appreciated that the various embodiments disclosed herein are not limited to any particular configuration of device 210.

In certain embodiments device 210 provides functionality that enables document recipient 200 to receive, view, search, annotate, electronically sign, and otherwise interact with an electronic document. Such interaction may involve responding to electronic signature requests received as part of an electronic signature workflow managed by electronic signature server 300. One specific example of such an interaction comprises using input/output components 212 to check a box indicating assent to terms associated with a received document. The electronic documents that document recipient 200 receives and signs can be stored in a local storage resource associated with device 210, such as local storage 220. Examples of local storage 220 include an internal hard drive, integrated random access memory, and a removable universal serial bus drive. In alternative embodiments device 210 is also configured to access remote storage resources, such as networked storage 500, storage hosted by electric signature server 300, or storage hosted by electronic mail service provider 600. As illustrated in FIG. 1, local storage 220 contains a collection of unsigned documents 222 and a collection of signed documents 224, although fewer documents may be stored in other embodiments. Unsigned documents 222 can be understood as documents which document recipient 200 has been requested to sign, but which have not actually been signed yet. Signed documents 224 can be understood as documents that have been signed using, for example, services provided by electronic signature server 300.

Local storage 220 may also store other digital assets used in certain implementations of the electronic signature framework disclosed herein. For example, in one embodiment local storage 220 contains a private key 226 that is uniquely assigned to document recipient 200. Private key 226 can be used, for example, to certify the authenticity of an electronic signature. In such embodiments private key 226 works in conjunction with a corresponding public key 324a held by electronic signature server 300. In another embodiment local storage 220 contains a document password 228 that can be used to decrypt and access the content of an encrypted document.

Referring still to the example embodiment illustrated in FIG. 1, electronic signature server 300 can be configured to manage and orchestrate workflows that enable documents provided by document originator 100 to be distributed to document recipient 200, and that enable document recipient 200 to electronically sign, assent to the terms of, or otherwise interact with such documents. Electronic signature server 300 is also optionally configured to record and/or respond appropriately to feedback indicating that document recipient 200 does not assent to the terms of a received document. To this end, electronic signature server 300 includes one or more modules configured to implement certain of the functionalities disclosed herein, and optionally further includes hardware configured to enable such implementation. Examples of enabling hardware include a processor 310, a memory 320, a communication module 340, and a bus and/or interconnect 390. Examples of implementing software include an operating system 330, a configuration module 350, an interactivity module 360, a secure storage manager 370, and a verification module 380. Additional or alternative enabling hardware components and implementing software components can be used in other embodiments.

Processor 310 can be any suitable processor, and may include one or more coprocessors or controllers, such as an audio processor or a graphics processing unit, to assist in processing operations of electronic signature server 300. Operating system 330 may comprise any suitable operating system, such as Google Android (Google Inc., Mountain View, Calif.), Microsoft Windows (Microsoft Corp., Redmond, Wash.), or Apple iOS or Apple OS X (Apple Inc., Cupertino, Calif.). As will be appreciated in light of this disclosure, the techniques provided herein can be implemented without regard to the particular operating system provided in conjunction with electronic signature server 300, and therefore may also be implemented using any suitable existing or subsequently developed platform. Communication module 340 can be any appropriate network chip or chipset which allows for wired and/or wireless communication via network 400 to external components such as one or more of the other components or systems described herein. Bus and/or interconnect 390 may also be provided to allow for inter- and intra-device communications using, for example, communication module 340.

Memory 320 can be implemented using any suitable type of digital storage, such as one or more of a disk drive, a universal serial bus drive, flash memory, and/or random access memory. From a conceptual standpoint, memory 320 can be understood as comprising short-term storage 322 and long-term storage 324. In some embodiments short-term storage 322 and long-term storage 324 are physically separate components, while in other embodiments the distinction is logical rather than physical. In either case, as used herein, the labels "short-term storage" and "long-term storage" refer simply to a first subset of data that is retained for a relatively shorter period of time, as compared to a second subset of data that is retained for a relatively longer period of time. As relative terms, such labels are not necessarily associated with any particular minimum or maximum storage duration.

In one embodiment short-term storage 322 is used as a repository for pending requests 322a for electronic signature. Pending requests 322a can be understood as documents which were provided by document originator 100, but which have not yet been signed or otherwise responded to by document recipient 200. Short-term storage 322 may also include a temporary repository for signed documents 322b, which in some implementations are retained for a limited amount of time. Retaining a document temporarily may be useful to prevent accidental loss before another party secures the document in long-term storage. Both pending requests 322a and signed documents 322b can be understood as comprising sensitive digital assets which may form an attractive target for a hacker. Storing such assets for a limited time (that is, in short-term storage 322) makes it more difficult for a hacker to compromise such assets. This is because a successful attack would not only need to overcome baseline security protocols established to protect electronic signature server 300 generally, but would also have to be timed appropriately to occur before such assets were removed from short-term storage 322. Thus, in a general sense, short-term storage 322 is particularly well-suited for storing sensitive digital assets temporarily, thus limiting their exposure to malicious attacks.

Long-term storage 324, on the other hand, is particularly well-suited for storing digital assets having little value to a hacker, and thus which are unlikely to be the target of a malicious cyber-attack. Exposure of digital assets retained in long-term storage 324 would adversely impact the integrity of the electronic signature framework minimally, if at all. For example, in one implementation long-term storage 324 includes one or more public keys 324a that are configured to be used in conjunction with the document originator's private key 126 or the document recipient's private key 226 to verify the authenticity of a document or an electronic signature. Exposure of public key 324a itself does not reveal secret information or provide access to secure assets, and thus it is unlikely to present an attractive target for a hacker.

Long-term storage 324 may also include document hash data 324b and document audit data 324c. Document hash data 324b comprises one or more character strings, each of which can uniquely identify one or more corresponding electronic documents. Document audit data 324c comprises metadata (such as file identifiers, file timestamps, file metadata, signatory identifiers, signature timestamps, device identifiers, catalog flags, one or more digital signatures if such signatures are maintained outside the document, and the like) that can uniquely identify a document processed by electronic signature server 300. Document hash data 324b and/or document audit data 324c can be used to establish a logical association between an electronically signed document (as characterized by document hash data 324b) and an electronic signature (as characterized by document audit data 324c). In many cases, exposure of either document hash data 324b or document audit data 324c will not reveal secret information or provide access to secure assets, and thus such data is unlikely to present an attractive target for a hacker.

In certain implementations long-term storage 324 also includes one or more encrypted documents 324d, the content of which cannot be accessed without a password. So that encrypted documents do not attract cyber-attacks, the decryption password is not retained at electronic signature server 300, but rather is held by one or more authorized parties, such as document originator 100 and/or document recipient 200. Thus, as in the case of public keys 324a, document hash data 324b, and document audit data 324c, exposure of encrypted documents 324d usually will not reveal secret information or provide access to secure assets. As a result, storing encrypted documents 324d at electronic signature server 300 is unlikely to present an attractive target for a hacker. As such, and in contrast to the assets stored in short-term storage 322, the digital assets stored in long-term storage 324 present minimal security risk, even if retained indefinitely.

Still referring to the example embodiment illustrated in FIG. 1, electronic signature server 300 further comprises configuration module 350. Configuration module 350 comprises instructions encoded on a computer readable medium that, when executed using a processor, cause a workflow configuration process to be invoked. The workflow configuration process allows a user, such as document originator 100, to define certain parameters of an electronic signature workflow. For example, in one embodiment the workflow configuration process allows document originator 100 to identify one or more document recipients 200, designate signature fields, and mark data entry fields for a document that is to be electronically signed. The workflow configuration process is additionally or alternatively configured to define security parameters, such as a data retention policy that sets forth how long a document should be retained in short-term storage 322 (if at all), and/or whether an encrypted version of the document should be retained in long-term storage 324. The workflow configuration process can be used to provide a user with information to help the user define an appropriate data retention policy, such as by explaining the relative security risks associated with long-term and short-term storage of unencrypted documents.

In certain embodiments electronic signature server 300 further comprises interactivity module 360. Interactivity module 360 comprises instructions encoded on a computer readable medium that, when executed using a processor, cause an interactive electronic signature process to be invoked. The interactive electronic signature process implements the aforementioned data retention policy, for example by generating and/or compiling document hash data 324b and/or document audit data 324c. Implementing the data retention policy also optionally involves sending notifications to document originator 100, document recipient 200, and/or any other authorized users to inform such users of the data retention policy, thereby allowing them to take appropriate measures to retain digital assets that will not be retained at electronic signature server 300. In certain embodiments electronic mail service provider 600 is used to distribute such notifications, although other communication channels, such as text message notifications or instant messenger notifications, can be used as well. In certain other embodiments, electronic mail service provider 600 is used to distribute to document originator 100 and document recipient 200 a signed document or a password to an encrypted document stored in memory 320. Such distribution of a document is optionally accomplished inline as an attachment in an electronic mail, or alternatively, as a hyperlink or reference to a resource stored on electronic signature server 300. The interactive electronic signature process also responds to events such as a failure to obtain a signatory's assent, or a failure to authenticate an electronic signature. Such response will optionally also comply with the aforementioned data retention policy. In certain embodiments the interactive electronic signature process also receives a document verification inquiry from an authorized user, and returns information generated in response to such inquiry. Thus, in general, the interactive electronic signature process can be understood as providing user interactivity functionality in the context of obtaining and verifying electronic signatures.

Interactive electronic signature process also provides an interface to users accessing the resources managed by electronic signature server 300. Such an interface may be provided by way of a graphical user interface rendered on a digital display, although other types of interfaces, such as voice response, touchtone, hand gestures, and textual interfaces, can be implemented as well. Separate user interfaces can be provided to document originator 100 and document recipient 200. For example, in one embodiment the interactive electronic signature process generates a graphical user interface capable of receiving from document originator 100 commands, parameters, and/or other metadata that define an electronic signature workflow. Such parameters may specify, for example, how a particular document is to be routed amongst a plurality of document recipients 200, and how electronic signature server 300 should handle various responses from one or more of document recipients 200. Likewise, interactive electronic signature process also generates a user interface capable of guiding document recipient 200 through the process of obtaining, reviewing, assenting to (or declining to assent to), and/or otherwise interacting with a document. In some cases interactive electronic signature process further provides a user interface that document originator 100, document recipient 200, and/or any other authorized party can use to validate the authenticity of an electronic signature or a signed document. Additional or alternative workflow aspects may be specified in other embodiments, and thus it will be appreciated that the various embodiments disclosed herein are not limited to any particular functionality provided by the interactive electronic signature process invoked by interactivity module 360.

Referring again to the example embodiment illustrated in FIG. 1, electronic signature server 300 further comprises secure storage manager 370. In such embodiments, secure storage manager 370 comprises instructions encoded on a computer readable medium that, when executed using a processor, cause a secure storage process to be carried out. In one embodiment, the secure storage process is configured to implement a data retention policy, for example by generating an encrypted document that is to be retained in long-term storage 324. To this end, secure storage manager 370 is also optionally configured to manage the creation, dissemination, and removal of the random password that is necessary to access the content of the encrypted document. In certain embodiments such password management functionality includes sending a notification to authorized users that the random password will be removed from electronic signature server 300. The password management functionality may also involve sending a notification to authorized users indicating, for example, when and how the random password was initially distributed. Electronic mail service provider 600 is optionally used to distribute such notifications.

Electronic signature server 300 also optionally includes verification module 380. In such embodiments, verification module 380 comprises instructions encoded on a computer readable medium that, when executed using a processor, cause a verification process to be carried out. In one implementation, the verification process is configured to help an authorized user locate an electronically signed document based on document audit data provided by the authorized user. This can be accomplished by querying document audit data 324*c* retained in long-term storage 324. In another implementation, the verification process is configured to help an authorized user verify the authenticity of an electronically signed document provided by the authorized user. This can be accomplished by comparing parameters such as the document hash and/or other characteristics of the provided document to document hash data 324*b* and/or document audit data 324*c*, respectively, retained in long-term storage 324. In another embodiment, the verification process involves comparing a document hash of a state or version of the signed document when it was signed with document hash data 324*b*. For example, extracting the state or version of a document when it was signed or certified in possible in a portable document format (PDF) document, even if the PDF document is subsequently annotated or modified. Regardless of the particular functionality provided by the verification process, verification module 380 is optionally further configured to generate a user interface capable of receiving queries based on document metadata and/or receiving an electronically signed document of unknown authenticity.

Document originator 100, document recipient 200, and electronic signature server 300 can communicate with each other via network 400. Network 400 can also be used to access supplementary resources such as networked storage 500 and electronic mail service provider 600 (which is optionally capable of providing encrypted electronic mail communications). Network 400 may be a local area network (such as a home-based or office network), a wide area network (such as the Internet), or a combination of such networks, whether public, private, or both. For example, in certain embodiments at least a portion of the functionality associated with network 400 is provided by a cellular data or Wi-Fi network, thereby making it easier for users of smartphones and tablet computers to interact with electronic signature server 300. In general, communications amongst the various entities and resources described herein may occur via wired and/or wireless connections, such as may be provided by Wi-Fi or mobile data networks. In some cases access to resources on a given network or computing system may require credentials such as a username and password, and/or may require compliance with any other suitable security mechanism. Furthermore, while only one document originator 100 and one document recipient 200 are illustrated in the example embodiment of FIG. 1, it will be appreciated that, in general, the system may comprise a distributed network of tens, hundreds, thousands, or more document originators 100 and/or document recipients 200 capable of interacting with a correspondingly large number of electronic signature servers 300.

The embodiments disclosed herein can be implemented in various forms of hardware, software, firmware, and/or special purpose processors. For example, in one embodiment a non-transitory computer readable medium has instructions encoded thereon that, when executed by one or more processors, cause one or more of the document distribution and interaction methodologies described herein to be implemented. The instructions can be encoded using any suitable programming language, such as C, C++, object-oriented C, Swift, JavaScript, Java, Visual Basic .NET, BASIC, or alternatively, using custom or proprietary instruction sets. Such instructions can be provided in the form of one or more computer software applications and/or applets that are tangibly embodied on a memory device, and that can be executed by a computer having any suitable architecture. In one embodiment the system can be hosted on a given website and implemented, for example, using JavaScript or another suitable browser-based technology.

The functionalities disclosed herein can optionally be incorporated into other software applications, such as document management systems or document viewers. For example, an application configured to view PDF files can be configured to implement certain of the functionalities disclosed herein upon detecting the presence of signature fields or other metadata in a given document, including signature fields intended for a handwritten signature. The systems disclosed herein may also optionally leverage services provided by other software applications, such as electronic mail readers. The computer software applications disclosed herein may include any number of different modules, sub-modules, or other components of distinct functionality, and can provide information to, or receive information from, still other components and/or subcomponents. These modules can be used, for example, to communicate with an input and/or output device such as a display screen, a touch sensitive surface, a printer, and/or any other suitable input/output device. Other components and functionality not reflected in the illustrations will be apparent in light of this disclosure, and it will be appreciated that the various embodiments disclosed herein are not limited to any particular hardware or software configuration. Thus in other embodiments electronic signature server 300 may comprise additional, fewer, or alternative subcomponents as compared to those recited in the illustrated embodiments.

The aforementioned non-transitory computer readable medium may be any suitable medium for storing digital information, such as a hard drive, a server, a flash memory, and/or random access memory. In alternative embodiments, the computer and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used in this regard, and that the present disclosure is not intended to be limited to any particular system architecture.

Document Signing Methodology

FIGS. 2A through 2E comprise a flowchart illustrating an example method 2000 for using electronic signature server 300 to acquire an electronic signature on a document and designate a data retention policy for the resulting electronically signed document. As can be seen, method 2000 includes a number of phases and sub-processes, the sequence of which may vary from one embodiment to another. However, when considered in the aggregate, these phases and sub-processes form a more secure electronic signature framework that is responsive to user input in accordance with certain of the embodiments disclosed herein. Method 2000 can be implemented, for example, using the system architecture illustrated in FIG. 1 and described herein. However other system architectures can be used in other embodiments, as will be apparent in light of this disclosure. To this end, the correlation of the various functionalities shown in FIGS. 2A through 2E to the specific components illustrated in FIG. 1 is not intended to imply any structural and/or use limitations. Rather other embodiments may include, for example, varying degrees of integration wherein multiple functionalities are effectively performed by one system or module. For example, in an alternative embodiment a single module can be used to provide secure storage management and document verification. Thus other embodiments may have fewer or more modules depending on the granularity of implementation. Numerous variations and alternative configurations will be apparent in light of this disclosure.

As illustrated in FIG. 2A, method 2000 commences with document originator 100 providing electronic signature server 300 with a document that is to be signed by document recipient 200. See reference numeral 2110 in FIG. 2A. At this point, the document may be referred to as an unsigned document. This can be accomplished, for example, by uploading a copy of the unsigned document from document originator's local storage 120 to electronic signature server 300. Alternatively, the unsigned document can be retrieved from networked storage 500. In some cases document originator 100 provides the unsigned document to electronic signature server 300 on his/her own accord. In other cases, document originator 100 provides the unsigned document in response to a request, such as a request from document recipient 200. For example, a new customer (document recipient) may request a license agreement from a software vendor (document originator), in response to which the software vendor provides a copy of the new license agreement (unsigned document) to electronic signature server 300, and configures the rules that govern how the new customer's electronic signature should be acquired. The unsigned document optionally includes a certificate or metadata such as a document hash that is encrypted using the document originator's private key 126, thus allowing document originator 100 to later be identified as such.

Regardless of how method 2000 commences, document originator 100 can use the workflow configuration process invoked by configuration module 350 to designate one or more signature fields, as well as one or more optional data entry fields in the unsigned document. See reference numeral 2120 in FIG. 2A. Such field marking can be performed automatically based on a field detection algorithm, or can be performed manually based on input from document originator 100. For example, in one embodiment metadata tags inserted into the unsigned document by document originator 100 at the time of creation indicate how configuration module 350 should mark the signature and data entry fields. In an alternative embodiment, document originator 100 marks the fields manually after the unsigned document is provided to, and optionally analyzed by, electronic signature server 300.

In certain embodiments document originator 100 also uses the workflow configuration process invoked by configuration module 350 to designate a data retention policy. See reference numeral 2140 in FIG. 2A. The data retention policy sets forth how long a signed copy of the document should be retained in short-term storage 322 (if at all), and/or whether an encrypted version of the signed document should be retained in long-term storage 324. The data retention policy also optionally sets forth how long unsigned copies of a document should be retained in short-term storage 322. The workflow configuration process generates a user interface that can be used to define such a data retention policy. FIG. 4 is an example user interface 4000 that can be used in this regard.

As illustrated in FIG. 4, in certain embodiments user interface 4000 comprises a user interface element for document retention control 4100 that includes a yes-no radio button for indicating whether, once the document is signed by all designated signatories, a temporary copy of the signed document should be retained in short-term storage 322 of electronic signature server 300. In applications where document originator 100 wishes to enhance security by reducing potential attack vectors against the signed document, document retention control 4100 can be set to "no". In this case, even if electronic signature server 300 is compromised, the content of the signed document will remain secure since such content will not even exist at electronic signature server 300.

Even if document retention control 4100 is set to "yes", limiting how long the temporary copy is retained in short-term storage 322 can still mitigate the potential security vulnerability. Thus in certain embodiments user interface 4000 further comprises a user interface element for short-term storage duration control 4200 that includes a dropdown menu for selecting a retention period. In alternate embodiments short-term storage duration control 4200 comprises a different type of user interface element, such as a popup menu, a text entry field, or a slider. Regardless of the type of user interface element invoked, short-term storage duration control 4200 allows document originator 100 to mitigate potential security exposure based on an assessment of how useful it is to retain a temporary copy of the signed document at electronic signature server 300. While the time period specified in FIG. 4 is measured using document execution as a starting point, other starting points can be used in other embodiments, such as the point at which the signed document is distributed to the signatories. In general, where document originator 100 uses document retention control 4100 to indicate that a temporary copy of the signed document should not be retained, short-term storage duration control 4200 is disabled.

Still referring to FIG. 4, user interface 4000 also comprises a user interface element for document encryption control 4300 that includes a yes-no radio button for indicating whether indefinitely retained copies of the signed document should be encrypted. Indefinitely retained copies of the signed document can be understood as those retained in long-term storage 324. In applications where document originator 100 wishes to enhance security by reducing potential attack vectors against the signed document, but still wishes to enjoy the convenience of retaining a copy of the signed document at electronic signature server 300, document encryption control 4300 is set to "yes". In this case, even if the security of electronic signature server 300 is compromised, the content of the signed document will remain secure since such content will be encrypted and since the password required to decrypt the content will not be retained at electronic signature server 300. This allows a copy of the signed document to be retained at electronic signature server 300 without risking exposure of the document content in the event that the security of electronic signature server 300 is compromised.

Document originator 100 can also use the workflow configuration process invoked by configuration module 350 to identify document recipient 200. See reference numeral 2150 in FIG. 2A. In one embodiment document recipient 200 is identified via an electronic mail address, although any other suitable identification technique can be used, including the use of an identification number, a username, a real name, or a phone number. In some cases document originator 100 can select a name from an address book or other directory of registered users of electronic signature server 300. Depending on the particular workflow, document originator 100 may identify multiple recipients 200 who should be required to sign the document.

After document recipient 200 has been identified, the interactive electronic signature process invoked by interactivity module 360 sends instructions for accessing and signing the document to document recipient 200. See reference numeral 2160 in FIG. 2A. Once this occurs, the unsigned document can be stored with pending requests 322a in short-term storage 322. In such case, the instructions sent to document recipient 200 comprise an address indicating the storage location in short-term storage 322 where the unsigned document is cached. This allows document recipient 200 to access and electronically sign the document without ever actually transferring the document to recipient's device 210. In an alternative embodiment, the unsigned document is transmitted directly to recipient's device 210, for example using electronic mail service provider 600. In this case the unsigned document is not retained in short-term storage 322, thus eliminating a potential vector for attempting to compromise the document content.

Document recipient 200 receives the instructions for accessing and signing the document. See reference numeral 2170 in FIG. 2A. After reviewing the document and the signing instructions, document recipient 200 decides whether he/she will assent to the document terms. See reference numeral 2210 in FIG. 2B. If so, document recipient 200 electronically signs the document as instructed. See reference numeral 2220 in FIG. 2B. Document recipient 200 may optionally certify his/her electronic signature using his/her private key 226. See reference numeral 2230 in FIG. 2B. As noted previously, in some implementations document recipient 200 can sign the document without ever actually transferring the document to recipient's device 210. In other implementations wherein the document is transferred to recipient's device 210, both unsigned and signed copies of the document can be retained in local storage 220 before further processing. The interactive electronic signature process invoked by interactivity module 360 then determines whether the electronic signature received from document recipient 200 can be authenticated. See reference numeral 2240 in FIG. 2B. Authentication can be performed using, for example, one or more of a variety of existing authentication techniques, including password authentication, certificate authentication, or biometric authentication.

If the electronic signature received from document recipient 200 can be authenticated, the interactive electronic signature process generates document hash data 324b and document audit data 324c for the signed document. See reference numeral 2250 in FIG. 2B. Document hash data 324b can be generated using any suitable cryptographic hash function that generates a fixed-length hash value based on an input string of any length. One example cryptographic hash function that can be used in this regard is the SHA256 function, which computes a 256-bit hash value using 32-bit words. Compiled information that characterizes the document or the signature can be used to generate document audit data 324c. Examples of such data include a file identifier, a file size, signatory identifiers, signature timestamps, signing device identifiers, and the like. Once generated, document hash data 324b and document audit data 324c can be stored in long-term storage 324.

The interactive electronic signature process also distributes the signed document or documents to document originator 100, document recipient 200, and any other designated parties, which are collectively referred to herein as the "intended distributees". See reference numeral 2260 in FIG. 2B. The signed document is optionally accompanied by a notification of the data retention policy that governs how the signed document will be retained in short-term storage 322 and/or long-term storage 324. See reference numeral 2310 in FIG. 2C. This enables the intended distributees to store copies of the signed document in a storage repository that satisfies more rigorous security criteria than electronic signature server 300 may provide. For example, in one embodiment an intended distributee may wish to store the signed document in an offline storage repository. Furthermore, providing notification with respect to the data retention policy allows the intended distributees to store their own copies of the signed document, or to save the password used to decrypt an encrypted copy of the signed document, before such assets are permanently removed from electronic signature server 300. In one embodiment the signed document and the data retention policy notification are distributed using electronic mail service provider 600. In some cases, the signed document and the data retention policy notification are optionally transmitted in separate electronic mail messages. In some cases one or more of the electronic mail messages are encrypted. In other embodiments the signed document and the data retention policy are distributed via a direct connection between electronic signature server 300 and each of the intended distributees.

Once the electronic signature is authenticated, the secure storage process invoked by secure storage manager 370 determines whether the data retention policy calls for an encrypted copy of the signed document to be retained. See reference numeral 2320 in FIG. 2C. If not, the unencrypted copy of the signed document is removed from short-term storage 322 pursuant to the data retention policy. See reference numeral 2338 in FIG. 2C. This may involve waiting for a time period that is designated in the data retention policy to reduce the likelihood that the signed document is removed from short-term storage 322 before the intended distributees are able to store their own copies.

On the other hand, if an encrypted copy of the signed document is to be retained at electronic signature server 300, the secure storage process invoked by secure storage manager 370 generates a copy of the signed document that is encrypted based on a randomly generated password. See reference numeral 2342 in FIG. 2C. The encrypted document is retained in long-term storage 324. See reference numeral 2344 in FIG. 2C. A copy of the encrypted document is also optionally transmitted to the intended distributees, although such transmission can be considered optional since the intended distributees can also obtain the encrypted document from electronic signature server 300. Secure storage process sends the randomly generated password (or a link to the randomly generated password) to the intended distributees. See reference numeral 2346 in FIG. 2C. In one embodiment the encrypted document and the randomly generated password are transmitted using electronic mail service provider 600, while in other embodiments they are instead transmitted via a direct connection between electronic signature server 300 and the intended distributees. Where both the encrypted copy of the signed document and the randomly generated password are transmitted, they are transmitted separately, such as in separate electronic mail messages. Once the randomly generated password is transmitted to the intended distributees, it is removed from electronic signature server 300 pursuant to the data retention policy. See reference numeral 2348 in FIG. 2C. This may involve waiting for a time period that is designated in the data retention policy to reduce the likelihood that the password is removed before the intended distributees are able to save it.

In some cases, document recipient 200 may elect not to assent to the document terms, in which case the interactive electronic signature process invoked by interactivity module 360 notifies document originator 100 of the refusal to assent. See reference numeral 2410 in FIG. 2D. Likewise, in some cases the electronic signature received from document recipient 200 cannot be authenticated, in which case interactive electronic signature process notifies document originator 100 of the signature authentication failure. See reference numeral 2420 in FIG. 2D. In either case, document hash data 324b and document audit data 324c for the unsigned document are generated. See reference numeral 2430 in FIG. 2D. Document hash data 324b can be generated in the same manner as for a signed document, that is, using any suitable cryptographic hash function that generates a fixed-length hash value based on an input string of any length. Document audit data 324c can be generated by compiling information that characterizes the document, such as a filename, a file identifier, a file size, an intended signatory identifier, and the like. Once generated, document hash data 324b and document audit data 324c can be stored in long-term storage 324. Document originator 100 is notified of the data retention policy that governs how the unsigned document will be retained in short-term storage 322 and/or long-term storage 324. See reference numeral 2440 in FIG. 2D.

The secure storage process invoked by secure storage manager 370 determines whether the data retention policy calls for an encrypted copy of an unsigned document to be retained. See reference numeral 2450 in FIG. 2D. If not, the unencrypted copy of the unsigned document is removed from short-term storage 322 pursuant to the data retention policy. See reference numeral 2568. In FIG. 2E. This may involve waiting for a time period that is designated in the data retention policy to reduce the likelihood that the unsigned document is removed from short-term storage 322 before document originator 100 is able to store his/her own copy.

On the other hand, if an encrypted copy of the unsigned document is to be retained at electronic signature server 300, the secure storage process invoked by secure storage manager 370 generates a copy of the unsigned document that is encrypted based on a randomly generated password. See reference numeral 2472 in FIG. 2D. The encrypted document is retained in long-term storage 324. See reference numeral 2574 in FIG. 2E. A copy of the encrypted document is also optionally transmitted to document originator 100, although such transmission can be considered optional since document originator 100 can also obtain the encrypted document from electronic signature server 300. Secure storage process transmits the randomly generated password to document originator 100. See reference numeral 2576 in FIG. 2E. In one embodiment the encrypted document and the randomly generated password are transmitted using electronic mail service provider 600, while in other embodiments they are instead transmitted via a direct connection between electronic signature server 300 and document originator 100. Where both the encrypted copy of the unsigned document and the randomly generated password are transmitted, they are transmitted separately, such as in separate electronic mail messages. Once the randomly generated password is transmitted to document originator 100, it is removed from electronic signature server 300 pursuant to the data retention policy. See reference numeral 2578 in FIG. 2E. This may involve waiting for a time period that is designated in the data retention policy to reduce the likelihood that the password is removed before document originator 100 is able to save it. In certain embodiments, such as where document recipient 200 has declined to sign the document, an encrypted copy of the unsigned document can be sent to document recipient 200 as well.

Document Verification Methodology

FIGS. 3A and 3B comprise a flowchart illustrating an example method 3000 for using electronic signature server 300 to identify and/or verify the authenticity of an electronically signed document, wherein electronic signature server 300 does not retain the signed document and/or a document password. As can be seen, method 3000 includes a number of phases and sub-processes, the sequence of which may vary from one embodiment to another. However, when considered in the aggregate, these phases and sub-processes form a more secure document identification and/or verification framework that is responsive to user input in accordance with certain of the embodiments disclosed herein. Method 3000 can be implemented, for example, using the system architecture illustrated in FIG. 1 and described herein. However other system architectures can be used in other embodiments, as will be apparent in light of this disclosure. To this end, the correlation of the various functionalities shown in FIGS. 3A and 3B to the specific components illustrated in FIG. 1 is not intended to imply any structural and/or use limitations. Rather other embodiments may include, for example, varying degrees of integration wherein multiple functionalities are effectively performed by one system or module. For example, in an alternative embodiment a single module receives a document verification inquiry from an authorized user, determines the result of such inquiry, and returns information generated in response to the inquiry. Thus other embodiments may have fewer or more modules depending on the granularity of implementation. Numerous variations and alternative configurations will be apparent in light of this disclosure.

As illustrated in FIG. 3A, method 3000 commences upon receipt of a document verification inquiry from an authorized inquiring party. See reference numeral 3110 in FIG. 3A. The interactive electronic signature process invoked by interactivity module 360 detects and responds to such query. While document originator 100 and document recipient 200 may often submit document verification inquiries, in many cases third parties may also be authorized to verify documents that were electronically signed using electronic signature server 300. Thus receiving the document verification inquiry may involve authenticating the party submitting the query as an authorized inquiring party. Such authentication can be performed, for example, by matching a username and password with that provided by a previously registered authorized user. Other user authentication schemes can be invoked in other embodiments. As used herein, the term "authorized inquiring party" refers to a party that has been granted permission to submit document identification and/or verification inquiries to electronic signature server 300 in accordance with the methodologies disclosed herein.

Electronic signature server 300 can be configured to respond to different types of document verification inquiries. For example, in one verification scenario an authorized inquiring party seeks to obtain a copy of a document processed by electronic signature server 300 using information characterizing the document or the electronic signature. The queried document may be a signed document, such as in the case where the required parties assented to and signed the document. Alternatively, the queried document may be an unsigned document, such as in the case where a required party declined to sign the document, but where information characterizing the document was still indexed in document audit data 324c. In another verification scenario, an authorized inquiring party seeks to verify that an electronically signed document is authentic, and was actually signed by the indicated signatories using electronic signature server 300. Thus, in one embodiment the verification process invoked by verification module 380 makes an initial determination with respect to the type of verification inquiry that was received, and in particular, determines whether the inquiry includes a document to be verified. See reference numeral 3120 in FIG. 3A.

If the inquiry does not include a document, then the verification process queries the authorized inquiring party for information that could be used to identify the document or its electronic signature. Document audit data 324c can then be searched to identify signed or unsigned documents matching the query. See reference numeral 3142 in FIG. 3A. Any information recorded in document audit data 324c can be used as the basis for such a query. For example, in one application all documents tagged for signature or signed by a particular user may be queried. In another application all documents signed during a specified timeframe can be queried. In yet another application all documents signed using a particular device, for example as identified by a signing device identifier, can be queried. A combination of different search terms may be applied. In some cases the query will result in multiple matching documents, in which case the authorized inquiring party can be presented with a list of search results. The authorized inquiring party can browse the search results and select a document of interest.

Once the authorized inquiring party selects a document of interest, the interactive electronic signature process invoked by interactivity module 360 sends the authorized inquiring party data identifying transmission of the document of interest from electronic signature server 300. See reference numeral 3144 in FIG. 3A. Such a transmission may be, for example, an email message that is identified by its transmission date and its designated recipients. Such an electronic mail transmission can be identified by providing the authorized inquiring party with the date and time of transmission, and the address or addresses to which it was sent. In embodiments wherein a copy of the document is not retained at electronic signature server 300, identifying this transmission will help the authorized inquiring party locate the document of interest. Alternatively, in embodiments wherein an encrypted copy of the document of interest is retained in long-term storage 324, the encrypted copy of the document can be transmitted to the authorized inquiring party, optionally with data identifying transmission of the document password from electronic signature server 300. In either case, because electronic signature server 300 does not retain at least one of (a) an unencrypted version of the document of interest or (b) a password used to access an encrypted version of the document of interest, the query results will not yield the document content without at least one of these missing components being independently provided by one of the document signatories.

If the inquiry received from the authorized inquiring party does include a document, then the verification process receives such document. See reference numeral 3152 in FIG. 3A. This can be accomplished when, for example, the authorized inquiring party uploads or otherwise identifies the document to electronic signature server 300. The verification process then generates and/or extracts identifying information from the received document. Examples of such identifying information include a document hash, a document size, a document identifier, or a digitally signed certificate. In an alternative embodiment the document need not be received at electronic signature server 300, but rather the identifying information can be generated and/or extracted at a computer system associated with the authorized inquiring party, such as document originator 100 and/or document recipient 200.

The generated or extracted identifying information is then compared with corresponding document hash data 324b and/or document audit data 324c stored in long-term storage 324. See reference numeral 3154 in FIG. 3A. For example, in one embodiment, the verification process attempts to identify a document indexed in long-term storage 324 having an identical hash and/or size as compared to the document received from the authorized inquiring party. In another embodiment, the verification process attempts to identify a document that is indexed in long-term storage 324 and that has an identical hash and/or size as compared to the specific state or version of a document received from the authorized inquiring party, wherein the state or version of such a document received from the authorized inquiring part corresponds to the state or version of the document when it was digitally signed. In yet another embodiment, the verification process attempts to identify a document indexed in long-term storage 324 having an identical document identifier as compared to the document received from the authorized inquiring party. In yet another embodiment the verification process attempts to find a document identifier stored in a document catalog directory (such as a document catalog directory of a PDF file) that matches a document identifier of the received document. Optionally, where the received document contains a digitally signed certificate, verification process additionally or alternatively attempts to validate the certificate using one of public keys 324a stored in long-term storage 324. See reference numeral 3156 in FIG. 3A. Validation of a digitally signed certificate facilities making a determination with respect to whether a document has been modified from an original (certified) state.

Based on the aforementioned comparison, the verification process makes a determination with respect to whether the received document corresponds to or otherwise matches a document indexed or otherwise characterized in long-term storage 324. See reference numeral 3158 in FIG. 3A. If a matching document is not found, the interactive electronic signature process invoked by interactivity module 360 sends the authorized inquiring party a notification indicating that the received document could not be matched with any document processed by electronic signature server 300. See reference numeral 3159 in FIG. 3A. However, if a matching document is found, the interactive electronic signature process sends the authorized inquiring party all of the metadata that is stored in long-term storage 324, and that relates to the matching document. See reference numeral 3210 in FIG. 3B. Such metadata may be referred to as a "metadata profile". In a modified embodiment only a portion of the metadata profile is sent to the authorized inquiring party. Thus in implementations where the authorized inquiring party holds a document of questionable authenticity, verification process will generate either (a) a notification that the document could not be matched with any document processed by electronic signature server 300, or (b) a metadata profile that can be used to verify the authenticity of the document. This can be accomplished even though electronic signature server 300 does not retain an unencrypted (and therefore accessible) version of the document.

In certain implementations the verification process invoked by verification module 380 determines whether an encrypted version of the matching document is stored in long-term storage 324. See reference numeral 3220 in FIG. 3B. If so, interactive electronic signature process invoked by interactivity module 360 sends the encrypted copy of the document to the authorized inquiring party, optionally with data identifying transmission of the document password from electronic signature server 300. See reference numeral 3230 in FIG. 3B. Such a transmission may be, for example, an email message that contains the password and that is identified by its transmission date and its designated recipients. It can be identified by providing the authorized inquiring party with the date and time at which it was transmitted, and the address or addresses to which it was sent. Because electronic signature server 300 does not retain at least one of (a) an unencrypted version of the matching document or (b) a password used to access an encrypted version of the matching document, the query results will not yield the document content without at least one of these missing components being independently provided by one of the document signatories.

Further Example Embodiments

Numerous variations and configurations will be apparent in light of this disclosure. For instance, one example embodiment provides a computer-implemented electronic signature acquisition method 5000 that is illustrated in FIG. 5. The method comprises providing a short-term storage resource that is administered by an electronic signature server, and that is configured to store digital assets managed by the electronic signature server. See reference numeral 5100 in FIG. 5. The method further comprises receiving, from a document originator, a document that is to be distributed to a document recipient as part of an electronic signature workflow that is managed by the electronic signature server. See reference numeral 5200 in FIG. 5. The document includes one or more document terms. The method further comprises receiving, from the document originator, one or more parameters that define a data retention policy. See reference numeral 5300 in FIG. 5. The method further comprises receiving, from the document recipient, an indication of assent to the one or more document terms included in the document. See reference numeral 5400 in FIG. 5. The method further comprises storing an electronically signed version of the document in the short-term storage resource. See reference numeral 5500 in FIG. 5. The method further comprises sending a notification to the document originator and the document recipient indicating that the signed version of the document will be removed from the short-term storage resource at a specified time. See reference numeral 5600 in FIG. 5. The method further comprises removing the signed version of the document from the short-term storage resource at the specified time and in accordance with the data retention policy. See reference numeral 5700 in FIG. 5. After said removing the electronic signature server does not retain a copy of the document. In some cases the method further comprises (a) providing a long-term storage resource that is administered by the electronic signature server; (b) generating (i) an encrypted copy of the signed version of the document and (ii) a password necessary to decrypt the encrypted copy; (c) storing the encrypted copy in the long-term storage resource; (d) sending the password to at least one of the document originator and the document recipient; and (e) removing the password from the electronic signature server. In some cases the one or more parameters includes a document retention control toggle that indicates that the signed version of the document should be removed from the short-term storage resource after the indication of assent is received. In some cases the one or more parameters includes a document encryption control toggle that indicates whether the electronic signature server should generate an encrypted copy of the signed version of the document. In some cases the one or more parameters includes a short-term storage duration parameter that defines the specified time in terms of a time period that begins at a point that is selected from a group consisting of (a) when the indication of assent is received, and (b) when the document is distributed to the document recipient. In some cases the one or more parameters includes a short-term storage duration parameter that defines the specified time in terms of a time period that begins when the notification is sent. In some cases (a) the notification includes a copy of the electronically signed version of the document; (b) the notification is sent to at least one of the document originator and the document recipient via electronic mail; and (c) the method further comprises saving a transmission record of the notification that includes a notification timestamp and a notification recipient identifier. In some cases the method further comprises (a) providing a long-term storage resource that is administered by the electronic signature server; (b) generating document audit data characterizing the signed version, wherein the document audit data includes at least one of a document identifier, a signatory identifier, a digital signature, and a signature timestamp; and (c) saving the document audit data in the long-term storage. In some cases the method further comprises (a) providing a long-term storage resource that is administered by the electronic signature server; (b) generating a hash of the signed version of the document before removing the signed version from the short-term storage resource; and (c) saving the hash in the long-term storage resource. In some cases the method further comprises displaying a user interface that allows the document originator to define the one or more parameters that define the data retention policy.

Another example embodiment provides an electronic signature system. The system comprises a memory device. The system further comprises a processor that is operatively coupled to the memory device. The processor is configured to execute instructions stored in the memory device that, when executed, cause the processor to carry out an electronic signature analysis process. The electronic signature analysis process comprises receiving, by an electronic signature server, a document verification inquiry from an authorized inquiring party. The document verification inquiry includes one or more properties characterizing a document of interest. The electronic signature analysis process further comprises querying document audit data stored in a storage resource managed by the electronic signature server. The document audit data characterizes a plurality of documents processed by the electronic signature server. The electronic signature analysis process further comprises generating query results that include document audit data characterizing at least one document having the one or more properties received with the document verification query. The at least one document includes the document of interest. The electronic signature analysis process further comprises sending, to the authorized inquiring party, document audit data characterizing the document of interest. At least one of (a) an unencrypted version of the document of interest and (b) a password used to access an encrypted version of the document of interest are not stored in the storage resource. In some cases the authorized inquiring party is authenticated based on receipt of a trusted credential selected from a group consisting of a password, a digital certificate, and a token form a trusted authentication provider. In some cases the authorized inquiring party is a signatory to the document of interest. In some cases the electronic signature analysis process further comprises sending, to the authorized inquiring party, a transmission report that provides a timestamp and a recipient for a transmission of the document of interest to a signatory to the document of interest. In some cases the electronic signature analysis process further comprises sending, to the authorized inquiring party, an encrypted version of the document of interest.

Another example embodiment provides a computer program product encoded with instructions that, when executed by one or more processors, causes a document workflow process to be carried out. The document workflow process comprises receiving, by an electronic signature server, a document verification inquiry from an authorized inquiring party. The document verification inquiry includes a document of unknown authenticity. The document workflow process further comprises generating a hash of the document having unknown authenticity. The document workflow process further comprises matching the hash of the document having unknown authenticity with an archived hash stored in a storage resource provided by the electronic signature server. The document workflow process further comprises sending, to the authorized inquiring party, document audit data characterizing an electronic signature that was applied to the document of unknown authenticity in an electronic signature workflow managed by the electronic signature server. At least one of (a) an unencrypted version of the document of unknown authenticity and (b) a password used to access an encrypted version of the document of unknown authenticity are not stored by the electronic signature server. In some cases the document workflow process further comprises sending, to the authorized inquiring party, a transmission report that provides a timestamp and a recipient for an electronic mail containing a password used to access an encrypted version of the document of unknown authenticity. In some cases the document audit data includes at least one of a signatory identifier and a signatory timestamp. In some cases the document workflow process further comprises matching a size of the document having unknown authenticity with a size of a document indexed in document audit data stored by the electronic signature server. In some cases receiving the document verification inquiry further comprises receiving a network address corresponding to a location where the document of unknown authenticity is stored. In some cases the hash of the document having unknown authenticity is generated based on a state of the document when it was digitally signed. In some cases the document workflow process further comprises matching (a) a size of the document having unknown authenticity when it was digitally signed with (b) a size of a document indexed in the document audit data.

Another example embodiment provides a computer program product encoded with instructions that, when executed by one or more processors, cause a document workflow process to be carried out. The document workflow process comprises generating a hash of an electronically signed document that is received by an electronic signature server in the course of an electronic signature workflow. The document workflow process further comprises storing the hash of the electronically signed document in a long-term storage resource managed by the electronic signature server. The document workflow process further comprises removing any copies of the electronically signed document that are stored in storage resources managed by the electronic signature server. The document workflow process further comprises receiving, by the electronic signature server, a document verification inquiry from an authorized inquiring party. The document verification inquiry includes a document of unknown authenticity. The document workflow process further comprises generating a hash of the document of unknown authenticity. The document workflow process further comprises matching the hash of the document of unknown authenticity with the hash of the electronically signed document that is stored in the long-term storage resources managed by the electronic signature server. The document workflow process further comprises sending, to the authorized inquiring party, document audit data characterizing an electronic signature that was applied to the electronically signed document. In some cases the document workflow process further comprises sending, to the authorized inquiring party, a transmission report that provides a timestamp and a recipient for an electronic mail containing the electronically signed document. In some cases the document audit data includes at least one of a signatory identifier and a signatory timestamp. In some cases the document workflow process further comprises matching a size of the document having unknown authenticity with a size of a document indexed in document audit data stored in the long-term storage resource. In some cases receiving the document verification inquiry further comprises receiving a network address corresponding to a location where the document of unknown authenticity is stored. In some cases the hash of the document having unknown authenticity is generated based on a state of the document of unknown authenticity when it was digitally signed. In some cases the document workflow process further comprises matching (a) a size of the document having unknown authenticity when it was digitally signed with (b) a size of a document indexed in document audit data stored in the long-term storage resource.

The foregoing description has been presented for the purposes of illustration and description. It is not intended to be exhaustive or to limit the disclosure to the particular described embodiments. Therefore many modifications and variations are possible in light of this disclosure. Thus it is intended that the scope of the invention be limited not by this detailed description, but rather by the claims appended hereto.

This disclosure is related to U.S. patent application Ser. No. 14/069,674 (filed 1 Nov. 2013), the entire disclosure of which is hereby incorporated by reference herein. This disclosure is related to U.S. patent application Ser. No. 14/107,967 (filed 16 Dec. 2013), the entire disclosure of which is hereby incorporated by reference herein. This disclosure is related to U.S. patent application Ser. No. 14/534,583 (filed 6 Nov. 2014), the entire disclosure of which is hereby incorporated by reference herein. This disclosure is related to U.S. patent application Ser. No. 14/551,560 (filed 24 Nov. 2014), the entire disclosure of which is hereby incorporated by reference herein. This disclosure is related to U.S. patent application Ser. No.

14/625,852 (filed 19 Feb. 2015), the entire disclosure of which is hereby incorporated by reference herein.

What is claimed is:

1. A computer-implemented electronic signature acquisition method comprising:
    providing a short-term storage resource that is administered by an electronic signature server, and that is configured to store digital assets managed by the electronic signature server;
    providing a long-term storage resource that is administered by the electronic signature server;
    receiving, from a document originator, a document that is to be distributed to a document recipient as part of an electronic signature workflow that is managed by the electronic signature server, wherein the document includes one or more document terms;
    receiving, from the document originator, one or more parameters that define a data retention policy;
    receiving, from the document recipient, an indication of assent to the one or more document terms included in the document;
    storing an electronically signed version of the document in the short-term storage resource;
    generating document audit data characterizing the signed version, wherein the document audit data includes at least one of a document identifier, a signatory identifier, a digital signature and a signature timestamp;
    saving the document audit data in the long-term storage;
    sending a notification to the document originator and the document recipient indicating that the signed version of the document will be removed from the short-term storage resource at a specified time; and
    removing the signed version of the document from the short-term storage resource at the specified time, and in accordance with the data retention policy, wherein after said removing the electronic signature server does not retain a copy of the document.

2. The method of claim 1, further comprising:
    generating (a) an encrypted copy of the signed version of the document and (b) a password necessary to decrypt the encrypted copy;
    storing the encrypted copy in the long-term storage resource;
    sending the password to at least one of the document originator and the document recipient; and
    removing the password from the electronic signature server.

3. The method of claim 1, wherein the one or more parameters includes a document retention control toggle that indicates that the signed version of the document should be removed from the short-term storage resource after the indication of assent is received.

4. The method of claim 1, wherein the one or more parameters includes a short-term storage duration parameter that defines the specified time in terms of a time period that begins at a point that is selected from a group consisting of (a) when the indication of assent is received, and (b) when the document is distributed to the document recipient.

5. The method of claim 1:
    wherein the notification includes a copy of the electronically signed version of the document;
    wherein the notification is sent to at least one of the document originator and the document recipient via electronic mail; and
    further comprising saving a transmission record of the notification that includes a notification timestamp and a notification recipient identifier.

6. The method of claim 1, further comprising:
    generating a hash of the signed version of the document before removing the signed version from the short-term storage resource; and
    saving the hash in the long-term storage resource.

7. The method of claim 1, further comprising displaying a user interface that allows the document originator to define the one or more parameters that define the data retention policy.

* * * * *